US010065810B2

(12) United States Patent
Savenok

(10) Patent No.: US 10,065,810 B2
(45) Date of Patent: Sep. 4, 2018

(54) HOT BEVERAGE CONTAINER ASSEMBLY AND LID CONSTRUCTION

(71) Applicant: Pavel Savenok, Wheaton, IL (US)

(72) Inventor: Pavel Savenok, Wheaton, IL (US)

( * ) Notice: Subject to any disclaimer, the term of this patent is extended or adjusted under 35 U.S.C. 154(b) by 526 days.

(21) Appl. No.: 14/498,053

(22) Filed: Sep. 26, 2014

(65) Prior Publication Data

US 2015/0090730 A1 Apr. 2, 2015

Related U.S. Application Data

(60) Provisional application No. 61/883,370, filed on Sep. 27, 2013.

(51) Int. Cl.
   *B65G 57/02* (2006.01)
   *B65D 43/02* (2006.01)

(52) U.S. Cl.
   CPC .......... *B65G 57/02* (2013.01); *B65D 43/0212* (2013.01); *B65D 2543/00027* (2013.01); *B65D 2543/0037* (2013.01); *B65D 2543/00046* (2013.01); *B65D 2543/00092* (2013.01); *B65D 2543/00231* (2013.01); *B65D 2543/00296* (2013.01); *B65D 2543/00351* (2013.01); *B65D 2543/00537* (2013.01); *B65D 2543/00629* (2013.01); *B65D 2543/00731* (2013.01); *B65D 2543/00962* (2013.01)

(58) Field of Classification Search
   CPC .......... B65D 2543/00231; B65D 2543/00046; B65D 43/0212; B65D 2543/00731; B65D 2543/00055

USPC ....... 220/713, 212, 215, 367.1, 367 A, 90.2; 215/307

See application file for complete search history.

(56) References Cited

U.S. PATENT DOCUMENTS

| | | | | |
|---|---|---|---|---|
| 4,795,052 A | * | 1/1989 | Hayes, Jr. ............. | B65D 47/06 220/369 |
| 5,873,493 A | | 2/1999 | Robinson | |
| 6,176,390 B1 | | 1/2001 | Kemp | |
| 6,488,173 B2 | * | 12/2002 | Milan .................. | B65D 47/043 215/387 |
| 7,448,510 B2 | | 11/2008 | Pavlopoulos | |

(Continued)

*Primary Examiner* — Anthony Stashick
*Assistant Examiner* — Raven Collins
(74) *Attorney, Agent, or Firm* — Christopher J. Scott

(57) ABSTRACT

An insert construction or formation is attachable to a basic lid construction for outfitting a hot beverage or liquid container assembly for enabling a user to enhance heat transfer from a relatively hot assembly-contained beverage or liquid prior to consumption. The insert construction or formation provides a damming structure located in adjacency to the primary liquid outlet of the basic lid construction for selectively transferring liquid intermediate a liquid-containing compartment and at least one beverage-cooling channel made part of the damming structure. Each beverage-cooling channel or formation directs liquid therethrough and transfers heat therefrom before the liquid exits the primary liquid outlet. The primary dam structure or insert construction thereby enables the user to redirect liquid movement via the basic lid construction for delaying liquid delivery via the primary beverage outlet and transferring heat therefrom prior to liquid consumption. Certain packaging methodology of the complex lid construction is further contemplated.

17 Claims, 32 Drawing Sheets

(56) References Cited

U.S. PATENT DOCUMENTS

2007/0062943 A1    3/2007   Bosworth, Sr.
2010/0264150 A1   10/2010   Leon et al.

\* cited by examiner

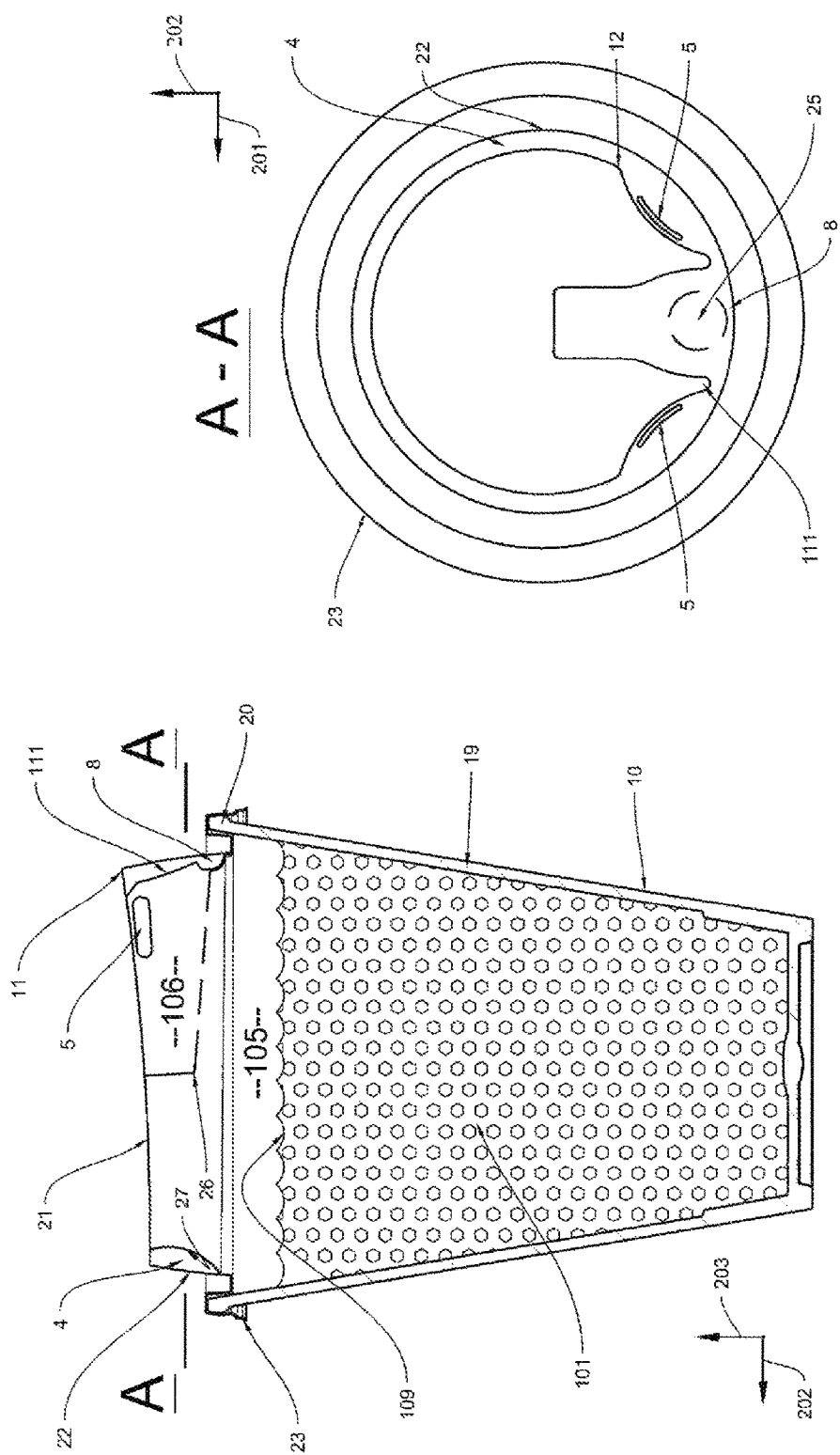

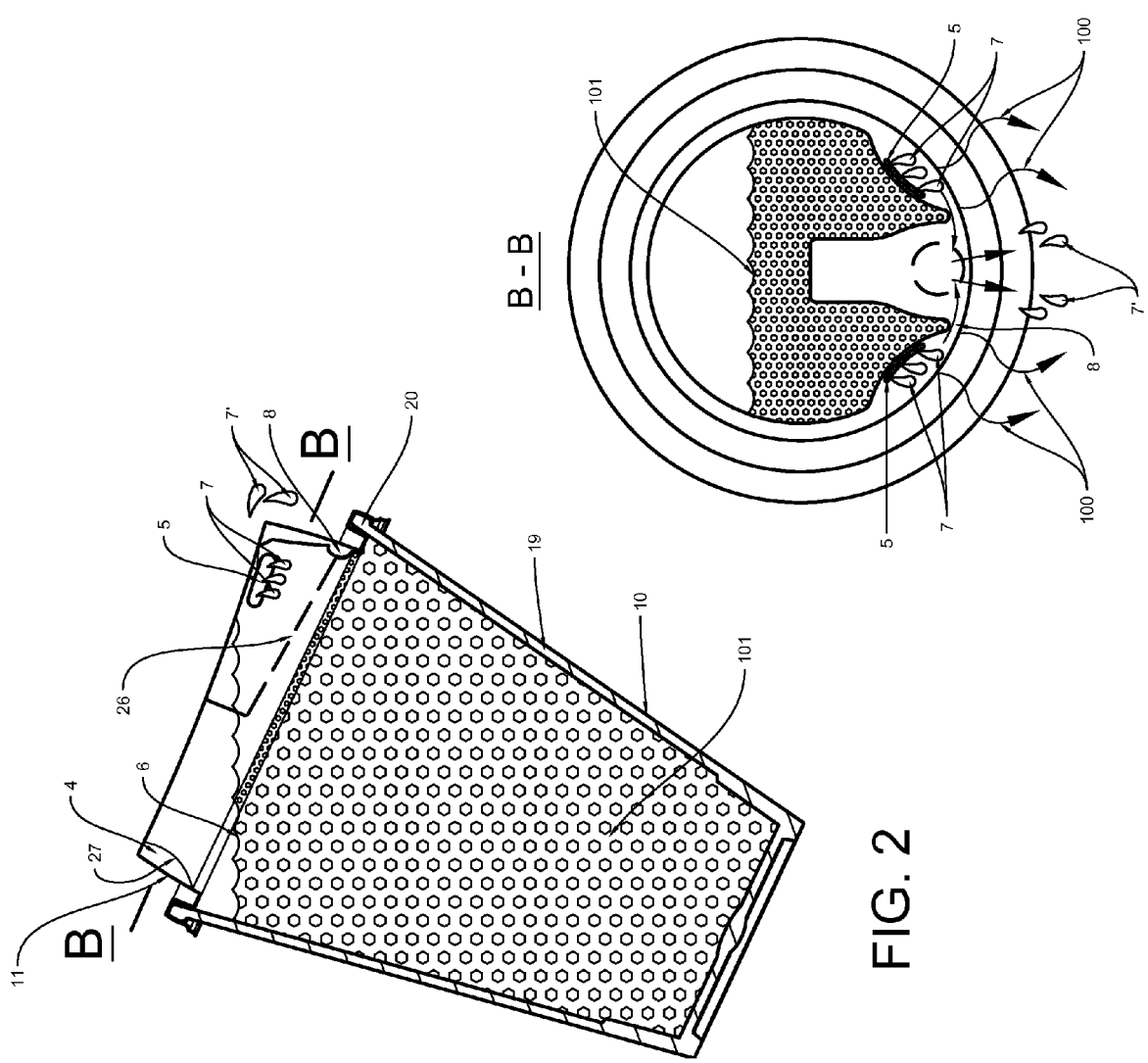

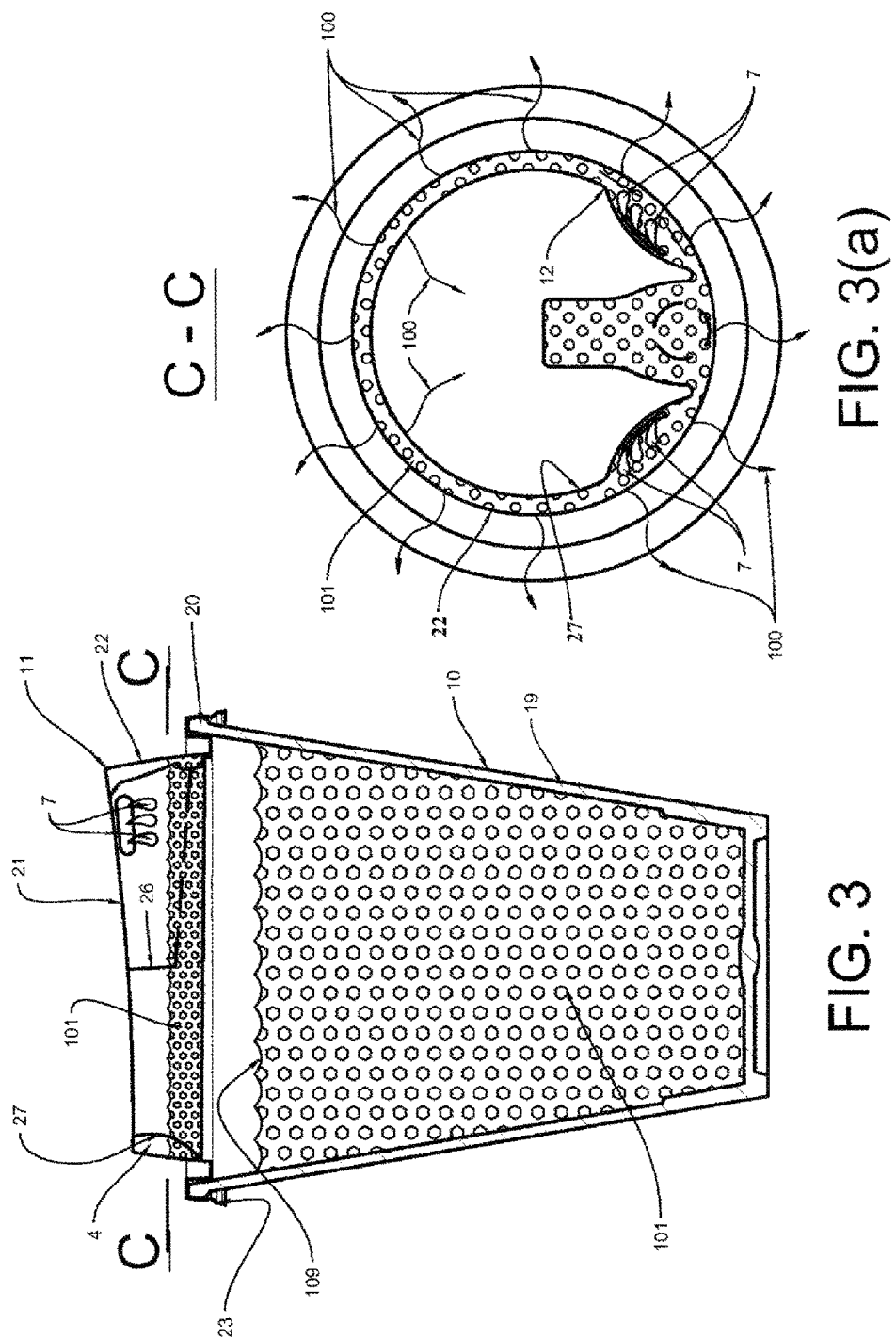

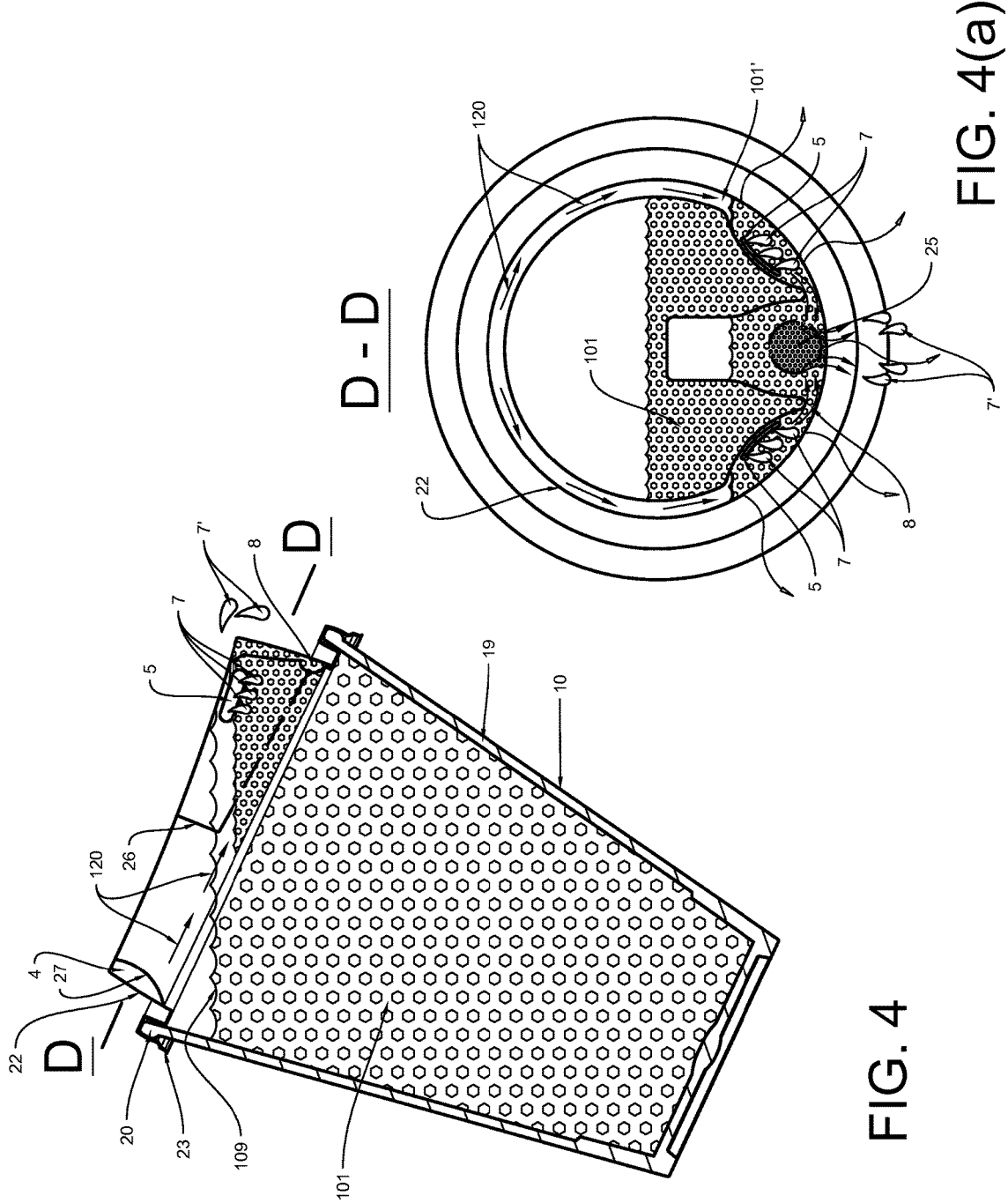

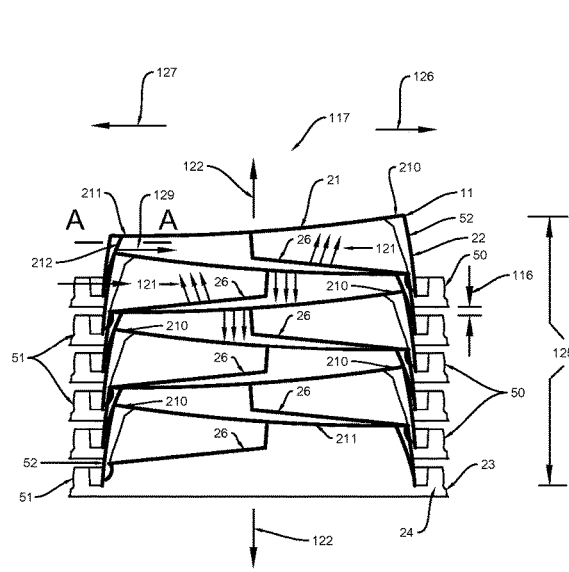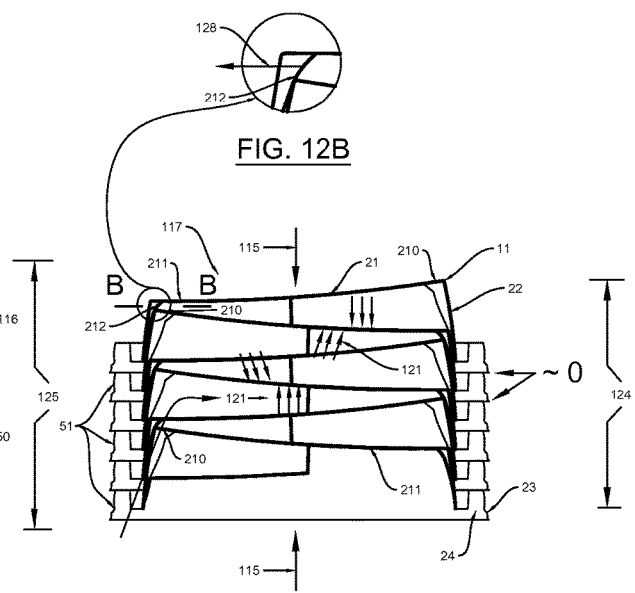
FIG. 11  FIG. 12
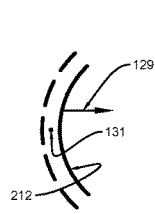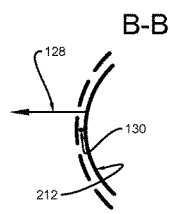
FIG. 11A  FIG. 12A

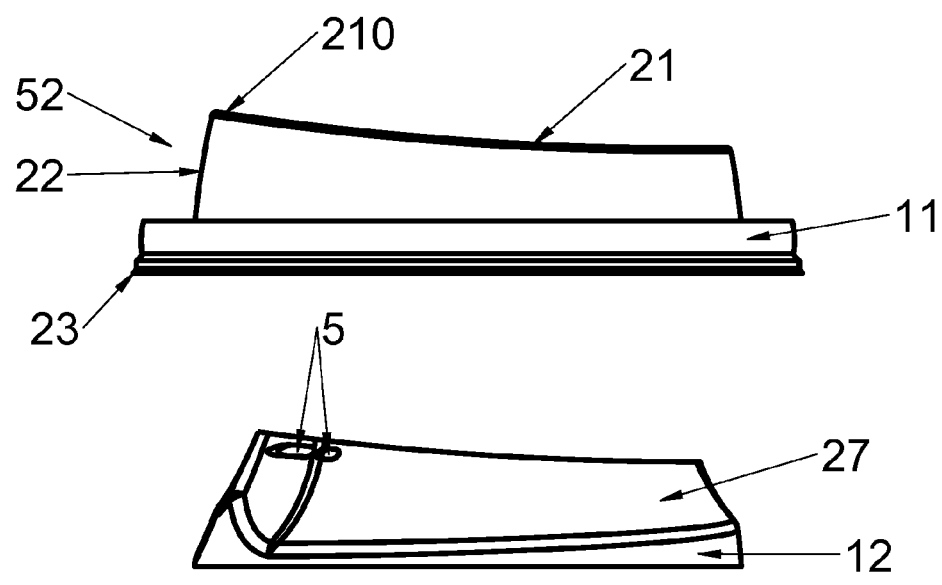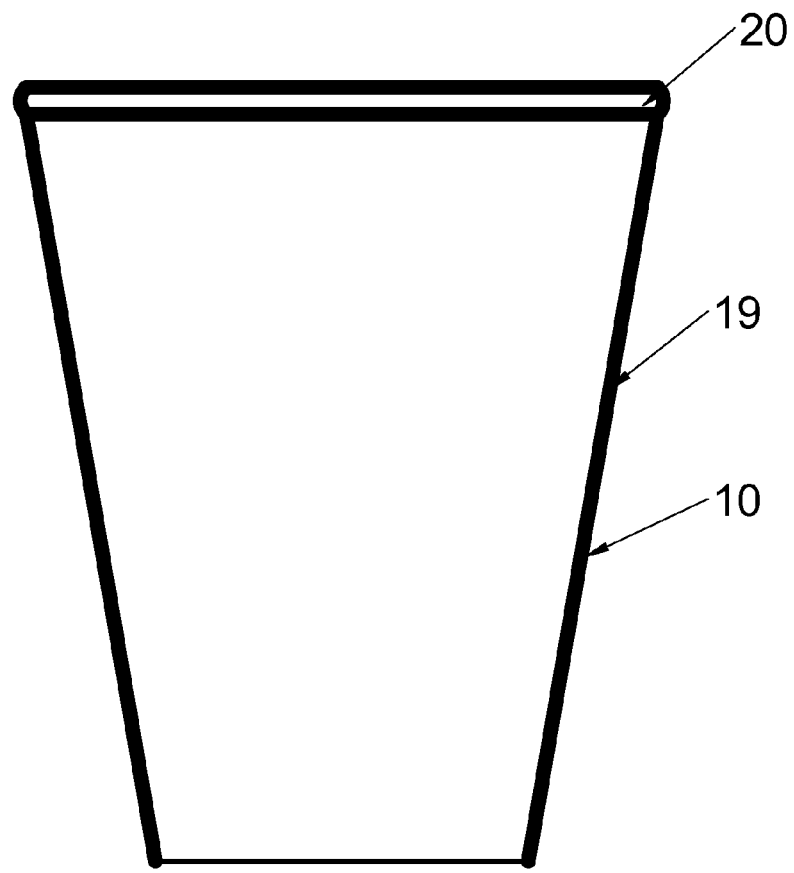
FIG. 19

HOT BEVERAGE CONTAINER ASSEMBLY AND LID CONSTRUCTION

PRIOR HISTORY

This application claims the benefit of U.S. Provisional Patent Application No. 61/883,370 filed in the United States Patent and Trademark Office on 27 Sep. 2013.

BACKGROUND OF THE INVENTION

Field of the Invention

The present invention generally relates to a combination lid-insert assembly for outfitting a hot beverage container. More particularly, the present invention relates to a combination lid-insert construction for outfitting a hot beverage container for enabling the drinker to slow the flow rate of hot beverage or to provide a short beverage-delivery delay for effecting a transfer of heat from the slowed or delayed beverage and allowing drinker to start inhaling air prior to liquid passing through main opening allowing air to mix with incoming liquid prior to consumption. Certain lid stacking and/or lid delivery methods are further supported by the following specifications.

Brief Description of the Prior Art

The broad field of lids for hot beverage containers and hot beverage container assemblies inclusive of lids is exceedingly well-developed. The art relating to means for cooling hot beverages prior to consumption is a bit more limited. In any case, it is most difficult to pinpoint the most pertinent art relevant to the present invention given the wide swath of art swept by beverage container constructions and developments. Nevertheless, some of the more pertinent prior is believed to be briefly described hereinafter.

U.S. Pat. No. 5,873,493 ('493 patent), which issued to Robinson, for example, discloses an Integrally Molded Measurer Dispenser. The '493 patent describes a closure providing a side wall having first and second distal ends, an inner surface and an outer perimeter. A cone-shaped divider projects inwardly and upwardly from a lower perimeter of the side wall and includes a drain-back orifice therethrough. The cone-shaped divider further includes an apex having an opening therethrough. The closure further provides a lid pivotally attached at an outer diameter thereof to the outer perimeter of the side wall first distal end by an integral hinge. The lid includes a shaped substantially conforming to the side wall perimeter.

U.S. Pat. No. 6,176,390 ('390 patent), which issued to Kemp, discloses a Container Lid with Cooling Reservoir. The '390 patent describes a container lid with a cooling reservoir for releasably covering a disposable cup containing a hot beverage. The cooling reservoir includes a side wall with a small opening to allow a small volume of the hot beverage to pass into the cooling reservoir in which the beverage sufficiently cools down to enable the consumer to sip the beverage.

U.S. Pat. No. 6,488,173 ('173 patent), issued to Milan, discloses a Beverage container lid having baffle arrangement for liquid cooling. The '173 patent describes a removable beverage container lid wherein the lid has a substantially enclosed space defined between an exterior cover and an interior cover. At least one inlet opening is formed in the interior cover directing a hot beverage to flow into the substantially enclosed space. Attached to the interior cover at the forward edge of the inlet opening is a partition or wall assembly having a height extending to be located substantially against the exterior cover and a length at least equal to the length of the inlet opening. Between the partition or wall assembly and the peripheral edge of the exterior cover is located a gap area. Connected with the gap area is a dispensing opening formed in the exterior cover. Hot beverage is required to flow around the partition or wall assembly and into the gap area prior to flowing through the dispensing opening exteriorly of a beverage container.

U.S. Pat. No. 7,448,510 ('510 patent), issued to Pavlopoulos, discloses a Cup Assembly having a Cooling Compartment. The '510 patent describes a cup assembly comprising a cup and a lid to define therebetween a first passage and a second passage to allow a liquid cooling compartment between the lid and the cup to be filled with liquid contained in the cup when the first passage is clear and the second passage is blocked and the liquid in the liquid cooling compartment is able to flow out of an outlet in communication with the liquid cooling compartment when the second passage is clear and the first passage is blocked.

United States Patent Application No. 2007/0062943, which was authored by Bosworth, Sr., describes a container lid for a cup-type beverage which includes within the lid a disc-shaped media in which the lid is adapted to be releasably affixed to the beverage container and where the lid is protected from the beverage within the container and wherein the disc may be removed from the lid and utilized for entertainment purposes.

United States Patent Application No. 2010/0264150, which was authored by Leon et al., describes a disposable beverage cup a disposable beverage cup that comprises a ledge between the cup's rim and the grasping portion of the cup that is commonly held in the user's hand. The ledge, which comprises a curb, a horizontal plane, and one or more indentations, acts as a barrier between the user's hand and other objects, preventing a lid that has been press fit onto the cup's rim from being dislodged. In order to remove the lid, the user must insert a finger and/or thumb into the indentation(s) and press upward on the lid. The cup has a contour between the ledge and the grasping portion with ergonomic features to increase the user's comfort in handling the cup.

United States Patent Application No. 2010/0320220, which was authored by Hussey et al., describes a plastic lid for a drinks container, for example, a coffee cup. The plastic lid is provided with an ancillary access facility in the form of an opening or a part of the lid easily removable to form an opening. The ancillary access facility allows a person to drink from the container without removal of the lid. After the ancillary access facility has been cleaned or de-contaminated it is protected by the application of a protective cover. The protective cover may have a variety of shapes, for example, it may cover the entire lid or it may cover only a selected part of the lid, for example, only the area of the lid involving the ancillary access facility. The protective cover protects the ancillary access facility from the inadvertent transfer of germs to the drinking area by the person dispensing the drinks as they push the lid down with their hands to seal the lid to the container top. The protective covers are arranged to be easily stripped from the lid by the application of mere finger pressure.

From a consideration of the foregoing, it will be noted that the prior art perceives a need for a low cost, disposable hot beverage container assembly having a combination lid-insert construction or complex lid construction built by way of a basic lid construction and an insert construction according to the present invention so as to enable the user to quickly and easily slow beverage or liquid flow rates or delay beverage delivery for transferring heat from the hot beverage or liquid so as to avoid scalding prior to beverage consumption or liquid delivery.

The prior art further perceives a need for lid-insert combination or complex lid construction that may be pre-packaged in stacked, spring-like columns so that when the user opens the stacked, spring-like column, the lid-insert combinations individually become decompressed and spring into a ready to use configuration. In this last regard, the prior art perceives a need for such a combination hot beverage container lid-insert assembly or combination, and certain lid-stacking and/or lid delivery methodology supported thereby as summarized in more detail hereinafter.

SUMMARY OF THE INVENTION

To achieve the aforementioned and other readily apparent objectives, the present invention essentially discloses a hot beverage container lid-insert assembly for enabling a user/drinker to effectively transfer heat from a relatively hot assembly-contained beverage so as to cool the beverage before it enters the user's/drinker's mouth. The present invention is thus contemplated to provide certain low-cost, disposable means for transferring thermal energy from a relatively hot liquid beverage to relatively cool surroundings so as to prevent scalding before consumption thereof.

When viewed in combination with a hot beverage container assembly, the present invention is believed to comprise a container structure, a lid structure, and an insert construction that is preferably integrally formed with or adhered to the lid construction. The insert construction according to the present invention preferably comprises a downwardly extended or bowed portion that extends radially inward from the insert periphery such that the central terminus partially extends across the diameter of the lid construction in a direction opposite that of the primary opening of the lid.

The essential container structure is believed to preferably comprise a container bottom, a container wall, and an upper container rim. The upper container rim has a rim perimeter, which rim perimeter preferably extends in a rim plane. The lid structure or construction is believed to preferably comprise a lip top, a lid wall, and a lower lid rim having a container rim-receiving groove. Thus, the lower lid rim receives or is otherwise attachably cooperable with the upper container rim. The lid top comprises a primary beverage outlet, which outlet may be of various sizes and configurations.

Central to the practice of the present invention is the insert construction of the lid-insert combination. The insert structure or construction preferably comprises a beverage-damming structure or portion and an outer rim-engaging structure or periphery. The insert construction is contemplated to be preferably formed from an elastic or resilient, thermally-insulative, food-grade, and heat-resistant material. It is contemplated that the material should undergo minimal or minimized structural/dimensional changes when heat is transferred into the material. The insert construction is preferably sized and shaped for receipt within the rim perimeter and, being received, a portion thereof extends in a convex manner relative to the rim plane.

In this last regard, a portion of the lid insert construction extends downwardly in a bowed manner relative to the lid top in inferior adjacency to the primary beverage outlet at the peak or highest point of the lid construction, and extends inwardly from the periphery of the lid rim toward the center of the insert construction. Noting that the upper surface of the lid structure or that the lid top is angled relative to the plane of the lid rim, successive lid assemblies may thus be stacked in an alternating manner such that the downwardly bowed portion of a first lid assembly fills space in inferior adjacency to the primary beverage outlet of the first lid assembly and fills space in superior adjacency to the lowest portion of the oblique lid top of a second lid assembly situated underneath the first lid assembly in stacked relation to one another.

This alternating alignment of lid assemblies may otherwise be described as a single column of stacked lid assemblies with alternating lid assembly configurations, wherein a first set of lid assemblies in the single stack have an alignment such that the bowed portions are directed in a first direction, and a second set of lid assemblies in the single stack have an alignment such that the bowed portions are directed in a second direction opposite the first direction.

In other words, the present invention provides a hot beverage container insert construction that is rotatable and thus re-orientable about a columnar stack axis intermediate two stacked configurations, the stacked configurations being designed for packaging and lid-delivery purposes. When the columnar configuration thus described is compressed, the bottom surface of the bowed portion comes into contact with the upper surface of the lid top situated directly underneath at the lower portion of the obliquely angled lid top.

The lid construction comprises a resilient material at the wall thereof and when in a compressed state, a wall portion becomes resiliently actuated. When the compressive force is removed, the wall portion relaxes and a lid-grabbing space is created intermediate vertically stacked lid assemblies for enabling the user to more easily grab a single lid assembly from the stack. The insert construction is thus a "pop-up" type container-lid insert that pops from the actuated state into the relaxed state by the removal of a compressive force directed axially into the stacked column.

Stated another way, the present invention is believed to essentially provide a lid insert construction for building a lid-insert combination or complex lid construction and thus provides a hot beverage container assembly when used in combination with a beverage container for enabling a user to transfer heat from a relatively hot assembly-contained beverage prior to consumption.

Thus when viewed systemically, or from an ensemble point of view, the invention may be said to preferably comprise, in combination, a beverage container, a basic lid construction, and an insert construction as variously contemplated within these specifications. The lid construction according to or cooperable with the present invention preferably comprises a primary beverage outlet. The various preferred and alternative insert construction(s) are preferably sized and shaped for attachment to the basic lid construction for defining a lower beverage-containing compartment and at least one upper beverage-cooling channel as at formations. The insert construction(s) preferably comprise a downwardly extended primary dam structure or portion. The primary dam structure is located in adjacency to the primary beverage outlet for redirecting beverage movement as it moves from the beverage-containing compartment to the beverage-cooling channels or formations, or compartments.

Each beverage-cooling channel defined by the insert construction(s) thus receives heat or effects a heat transfer from the beverage before said beverage exits the primary beverage outlet. The primary dam structure thereby provides certain beverage-redirection means for enabling the user to redirect beverage movement via the lid and insert constructions and for (a) delaying beverage delivery via the primary beverage outlet and (b) transferring heat therefrom prior to beverage consumption.

A downwardly extended portion preferably extends inwardly from an insert perimeter, and partially across the diameter of the basic lid construction in inferior adjacency to the primary beverage outlet. The channel formations together may be said to define a peripheral beverage-receiving channel intermediate the insert construction(s) and the basic lid construction for directing hot beverage into said channel for effecting radially directed heat transfer from the hot beverage through walls of the insert and lid constructions. The radially directed heat transfer effected by the beverage-receiving channel is believed to enhance heat transfer from the hot beverage prior to exiting the primary beverage outlet.

The beverage-redirection means according to the present invention may be exemplified by primary and secondary apertures. The primary apertures function primarily for outletting hot beverage from the beverage-containing compartment into the at least one beverage cooling channel, and the secondary apertures redirect or delay beverage movement between beverage-cooling channels for enhancing the heat transfer characteristics of the hot beverage container assembly, lid-insert combination, or insert construction(s).

The lid construction may optionally or alternatively comprise a lid top and a lid rim, whereby the lid top is angled obliquely relative to the lid rim such that a lid peak is structurally situated anteriorly adjacent the primary beverage outlet and a lower lid portion. The obliquely angled lid top of a first lid-insert combination may be oriented in opposed inferior adjacency to the downwardly extended portion of a second lid-insert combination thereby creating a lid stacking arrangement characterized by oppositely faced anterior portions of the lid-insert combinations in sequentially stacked lid-insert combinations, said stacking arrangement for reducing stacked height of lid-insert combinations.

A select construction as selected from the group consisting of the basic lid construction and the various insert construction(s), preferably comprises a resilient material construction. The resilient material construction, particularly at certain wall portions, enables a resiliently compressed stacking arrangement. The resiliently compressed stacking arrangement forms a compressed stacked height of lid-insert combinations. The compressed stacked height is lesser than a decompressed stacked height thereby leading to certain packaging methodology as briefly discussed hereinafter.

A lid-insert combination or lid construction packaging method, according to the present invention and believed supported by the following specifications and drawings submitted in support thereof, minimizes packaging space and may preferably provide end-users with pre-relaxed lid-insert combinations or complex lid constructions.

The lid packaging method according to the present invention may be said to preferably comprise the initial step of outfitting a series of lid constructions (e.g. basic lid constructions) with a series of insert constructions or forming a series of insert-outfitted lid assemblies, each outfitted lid construction being configurable in a first radially-directed lid configuration or a second radially-directed lid configuration opposite the first radially-directed lid configuration.

In other words, the first radially-directed lid configuration is oriented such that the anterior aspects of the lid assemblies extend in a first radial direction, and the second radially-directed lid configuration is oriented such that the anterior aspects of the lid assemblies extend in a second radial direction opposite the first radial direction. The series of insert-outfitted lid assemblies are stacked in a relaxed stacked columnar formation, such that the first lid configuration is alternated with the second lid configuration. The relaxed stacked columnar formation may then be compressed into compressed stacked columnar formation, and later decompressed from the compressed stacked columnar formation into a decompressed stacked columnar formation.

The compressed stacked columnar formation may be force-maintained via certain force maintenance means as may be exemplified by a certain wrapping or packaging, and the force-maintained compressed stacked columnar formation may then be shipped to an end user. Noting that the walls of the outfitted lid constructions may preferably comprise certain resilient materials, the method may comprise the optional steps of radially actuating the resilient material constructions via underlying upper wall-engaging portions of successive lid constructions during the compression step, and radially relaxing the resilient material constructions during the decompression step.

BRIEF DESCRIPTION OF THE DRAWINGS

Other features of my invention will become more evident from a consideration of the following brief descriptions of patent drawings:

FIG. 1 is a first sequential longitudinal cross-sectional depiction of a preferred lid-insert combination according to the present invention assembled atop a beverage container, showing the outfitted beverage container in a vertical orientation before being angled a first time. FIGS. 13-21 further show the preferred lid-insert combination according to the present invention.

FIG. 1(a) is a transverse cross-sectional view of the preferred lid-insert combination according to the present invention as sectioned at A-A in FIG. 1.

FIG. 2 is a second sequential longitudinal cross-sectional depiction of the preferred lid-insert combination according to the present invention assembled atop a beverage container, showing the outfitted beverage container in a first angled orientation for outletting beverage from the container into beverage-cooling channels of the preferred lid-insert combination.

FIG. 2(a) is a transverse cross-sectional view the preferred lid-insert combination according to the present invention as sectioned at B-B in FIG. 2.

FIG. 3 is a third sequential longitudinal cross-sectional depiction of the preferred lid-insert combination according to the present invention assembled atop a beverage container, showing the outfitted beverage container in a second vertical orientation for allowing beverage received in the beverage cooling channels of the lid-insert combination to transfer heat therefrom.

FIG. 3(a) is a transverse cross-sectional view of the preferred lid-insert combination according to the present invention as sectioned at C-C in FIG. 3.

FIG. 4 is a fourth sequential longitudinal cross-sectional depiction of the preferred lid-insert combination according to the present invention assembled atop a beverage container, showing the outfitted beverage container in a second angled orientation for outletting beverage from the beverage-cooling channels through the primary beverage outlet.

FIG. 4(a) is a transverse cross-sectional view of the preferred lid-insert combination according to the present invention as sectioned at D-D in FIG. 4.

FIG. 11 is a diagrammatic, first sequential longitudinal cross-sectional depiction of a stacked column of lid-insert combinations according to the present invention in a relaxed, uncompressed state showing a lid-grabbing space between lid-insert combinations.

FIG. 11A is a fragmentary diagrammatic depiction of a lid-to-wall junction site showing a wall construction radially relaxing to a relaxed position from an actuated position.

FIG. 12 is a diagrammatic, second sequential longitudinal cross-sectional depiction of a stacked column of lid-insert combinations according to the present invention in an actuated, compressed state eliminating the lid-grabbing space between lid-insert combinations.

FIG. 12A is a fragmentary diagrammatic depiction of a lid-to-wall junction site showing a wall construction radially actuating to an actuated position from a relaxed position.

FIG. 12B is an enlarged fragmentary sectional view as sectioned from FIG. 12 to more clearly show the lid-to-wall junction site and a resilient wall construction being actuated in a radially outward direction.

FIG. 13 is a diagrammatic depiction of the pathway beverage follows as it exits the hot beverage container assembly outfitted with the preferred lid-insert combination according to the present invention, hot beverage being depicted with a first, rightward-directed arrow, and cooling or cooled beverage being depicted with a second, leftward-directed arrow.

FIG. 14 is an enlarged frontal edge view depiction of the preferred lid-insert combination according to the present invention showing the lid portion of the lid-insert combination in broken lines and the insert portion of the lid-insert combination in solid lines.

FIG. 15 is a first enlarged top perspective view depiction of the preferred lid-insert combination according to the present invention showing the lid portion of the lid-insert combination in broken lines and the insert portion of the lid-insert combination in solid lines.

FIG. 16 is a first enlarged bottom perspective view depiction of the preferred lid-insert combination according to the present invention showing the lid portion of the lid-insert combination in broken lines and the insert portion of the lid-insert combination in solid lines.

FIG. 17 is an enlarged lateral edge view depiction of the preferred lid-insert combination according to the present invention showing the lid portion of the lid-insert combination in broken lines and the insert portion of the lid-insert combination in solid lines.

FIG. 18 is an exploded frontal view depiction of the preferred lid-insert combination according to the present invention showing the exploded lid-insert combination exploded from a beverage container.

FIG. 19 is an exploded lateral view depiction of the preferred lid-insert combination according to the present invention showing the exploded lid-insert combination exploded from a beverage container.

FIG. 20 is an exploded top perspective view depiction of the preferred lid-insert combination according to the present invention showing the exploded lid-insert combination exploded from a beverage container.

FIG. 21 is an exploded anterior top perspective view depiction of preferred lid-insert combination according to the present invention showing the exploded lid-insert combination exploded from a beverage container.

DETAILED DESCRIPTION OF THE PREFERRED EMBODIMENT AND METHODOLOGY

Figure 3B:
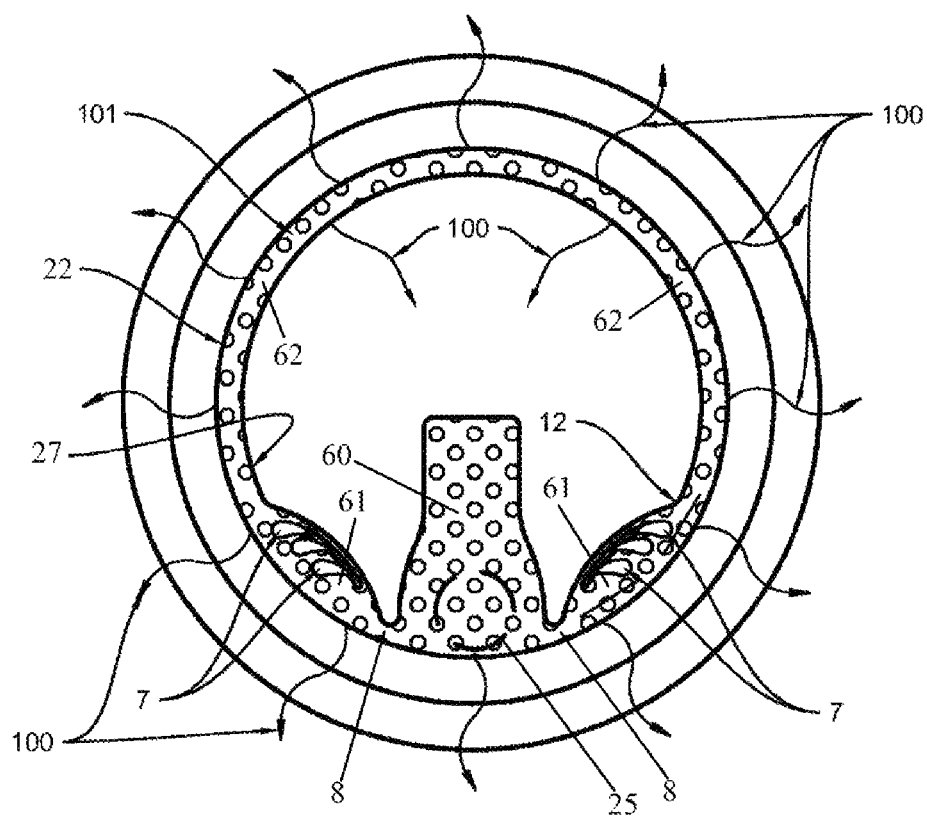
FIG. 3(b) is an enlarged transverse cross-sectional view of the preferred lid-insert combination according to the present invention as enlarged from FIG. 3(a) to depict in greater clarity various zones of spacing between the inner wall and the outer wall of an interstitial liquid-cooling channel of the lid-insert combination.

Referring now to the drawings with more specificity, the preferred embodiments of the present invention primarily concern a (hot) beverage container lid-insert combination or complex lid construction for enabling a user/drinker to effectively transfer heat (as generically referenced at 100) from a relatively hot assembly-contained beverage 101 so as to cool the beverage 101 before it enters the user's/drinker's mouth. The present invention is thus contemplated to provide certain low-cost, disposable means for transferring thermal energy from a relatively hot liquid beverage 101 to relatively cool surroundings so as to prevent scalding primarily and/or spillage secondarily.

Figure 10:
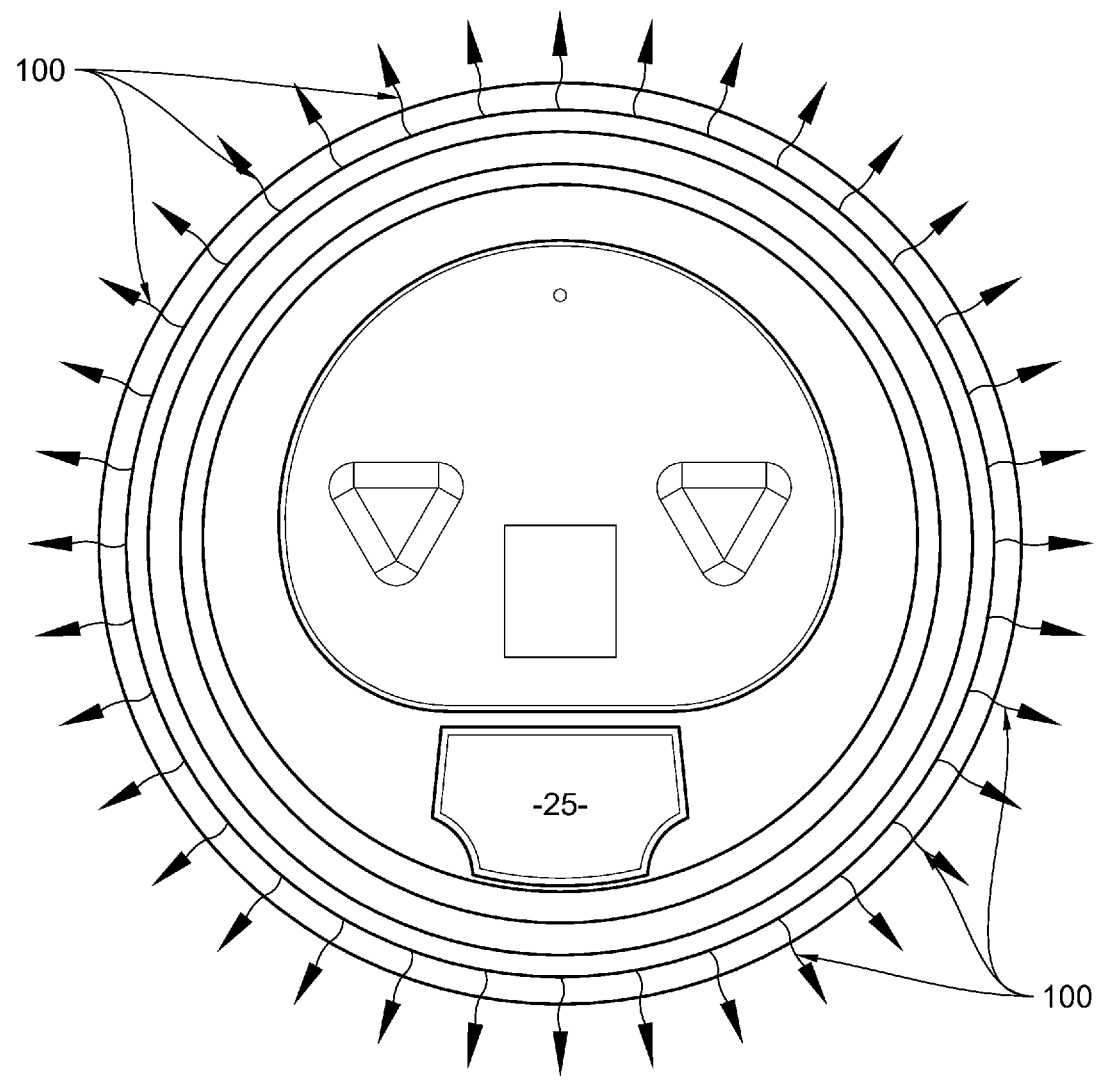
FIG. 10 is an enlarged transverse cross-sectional depiction of a generic lid-insert combination according to the present invention depicting radially directed thermal transfer of heat through an outer wall defining an annular beverage cooling channel or cavity embedded within the lid-insert combination.
Figure 13:
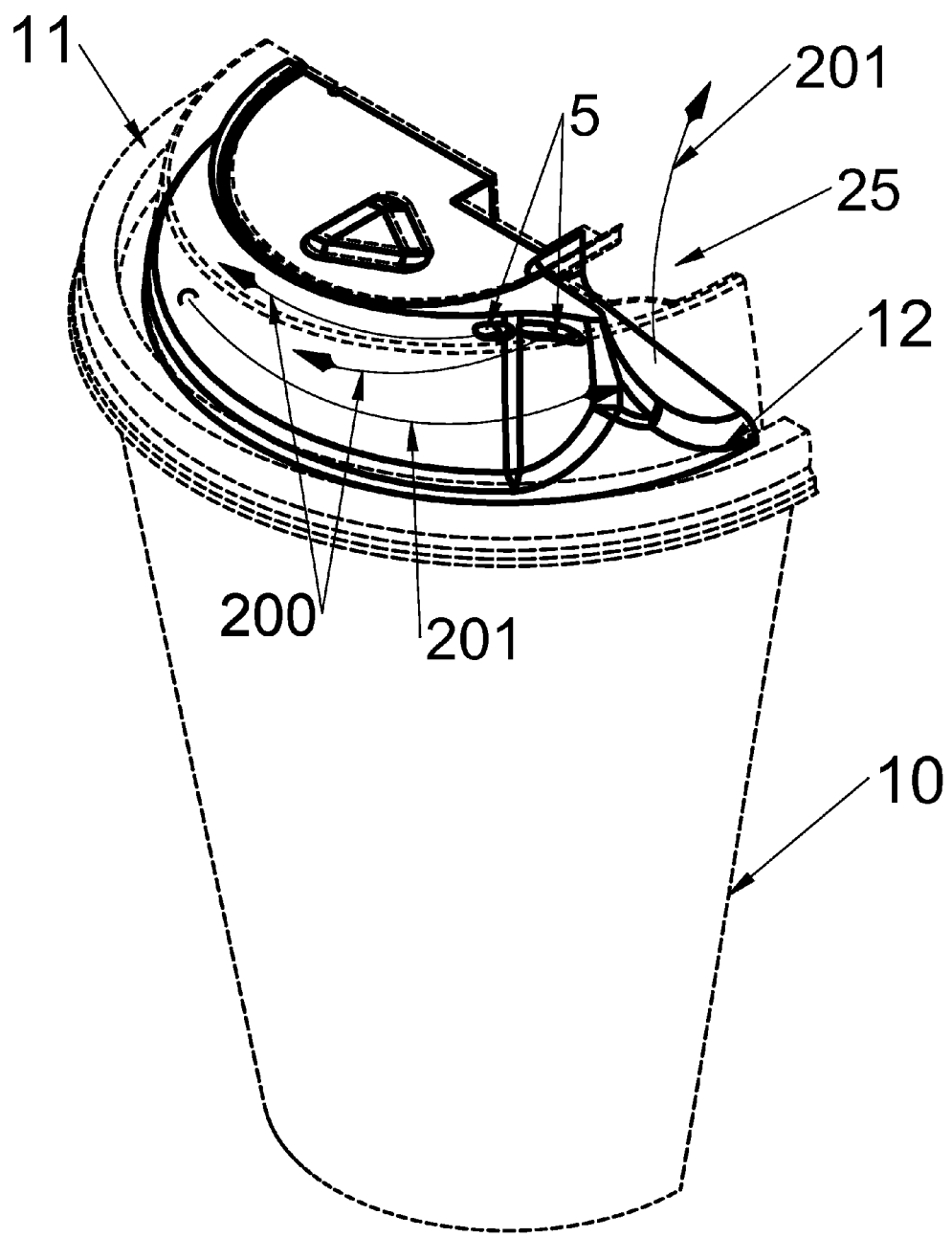
Figure 14:
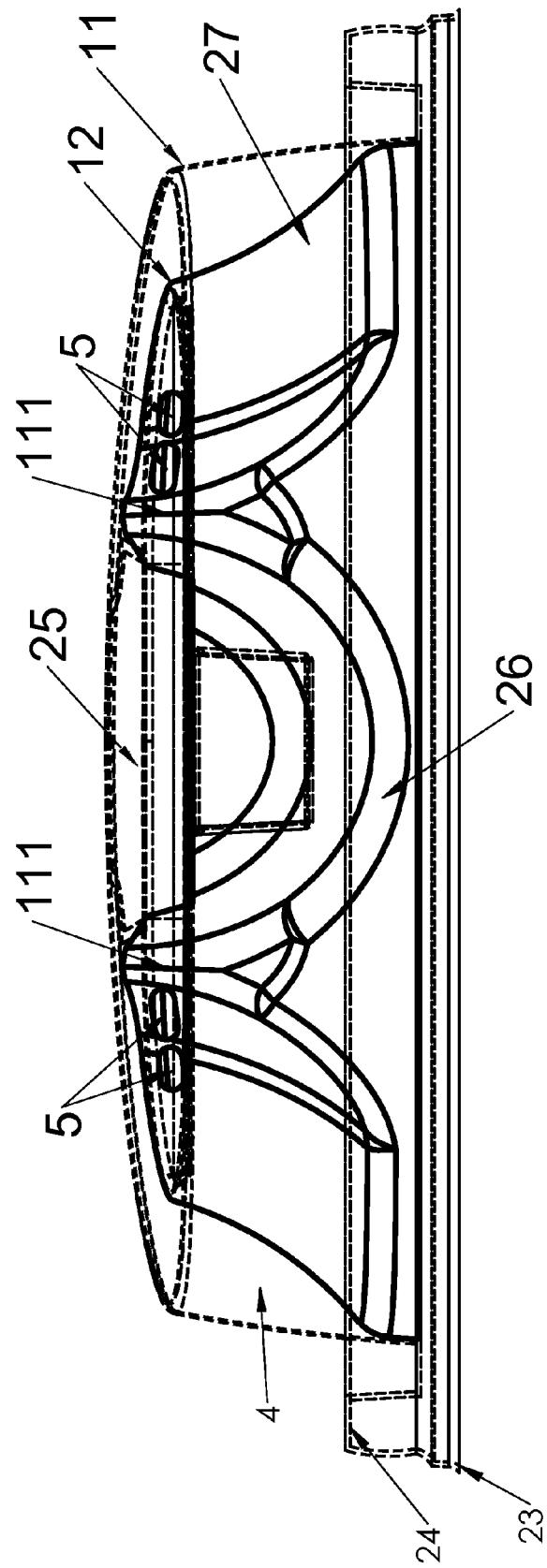
Figure 15:
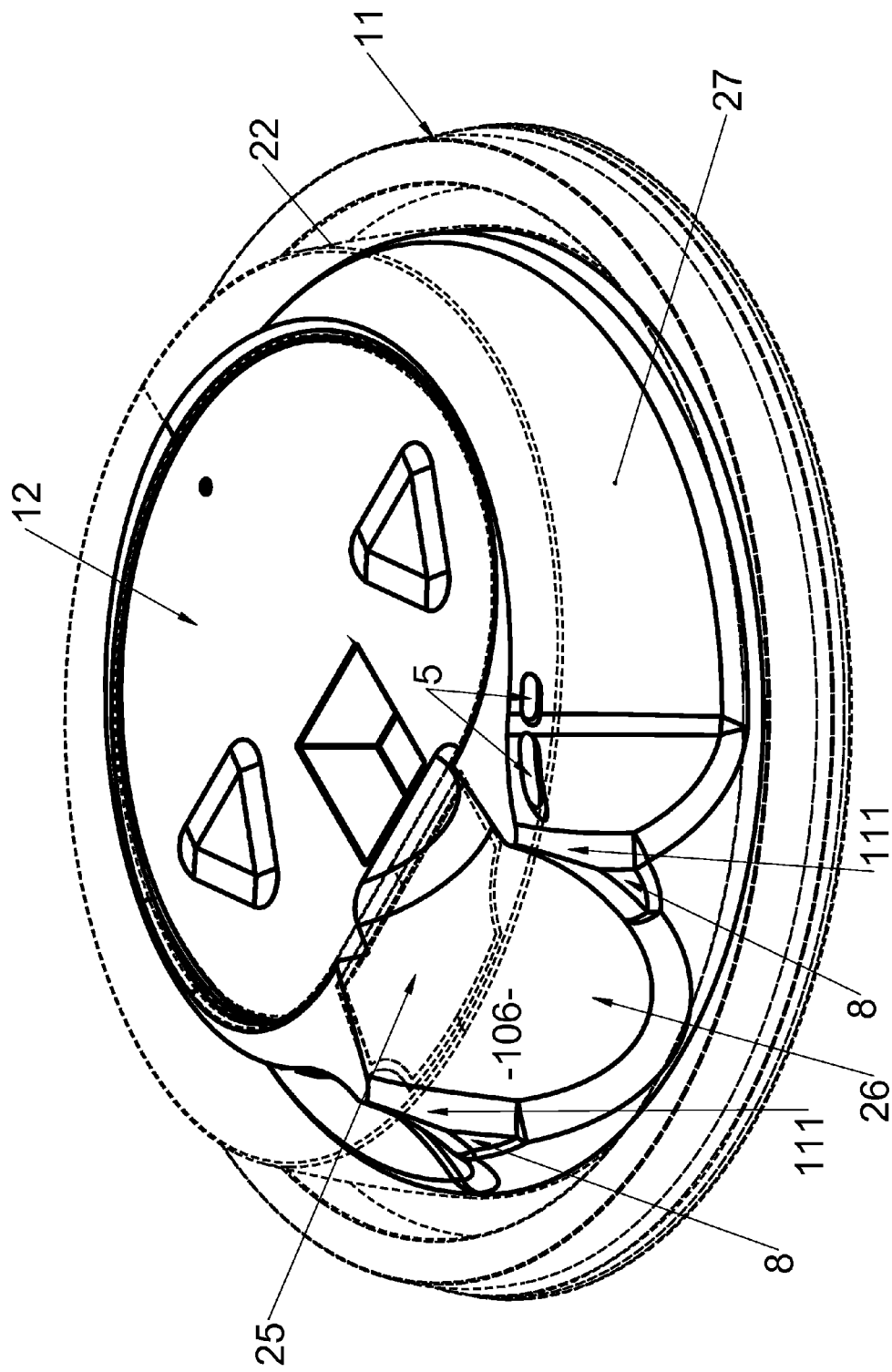
Figure 16:
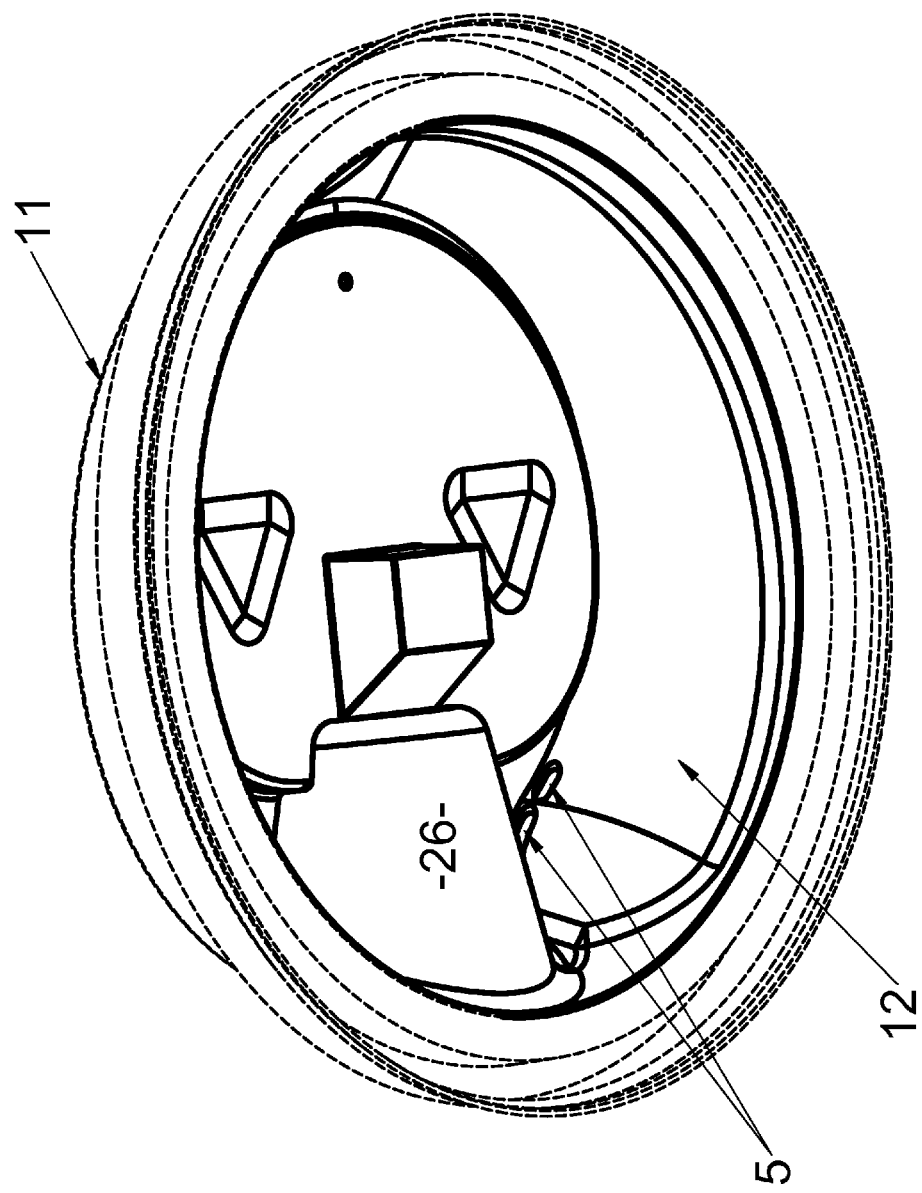
Figure 17:
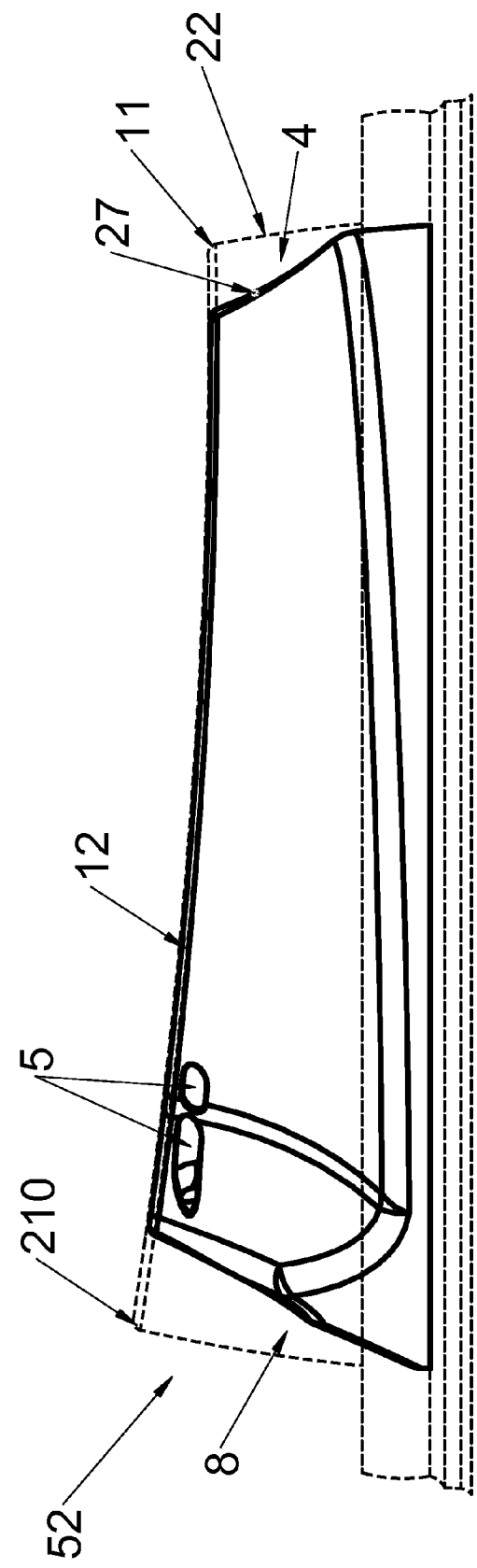
Figure 18:
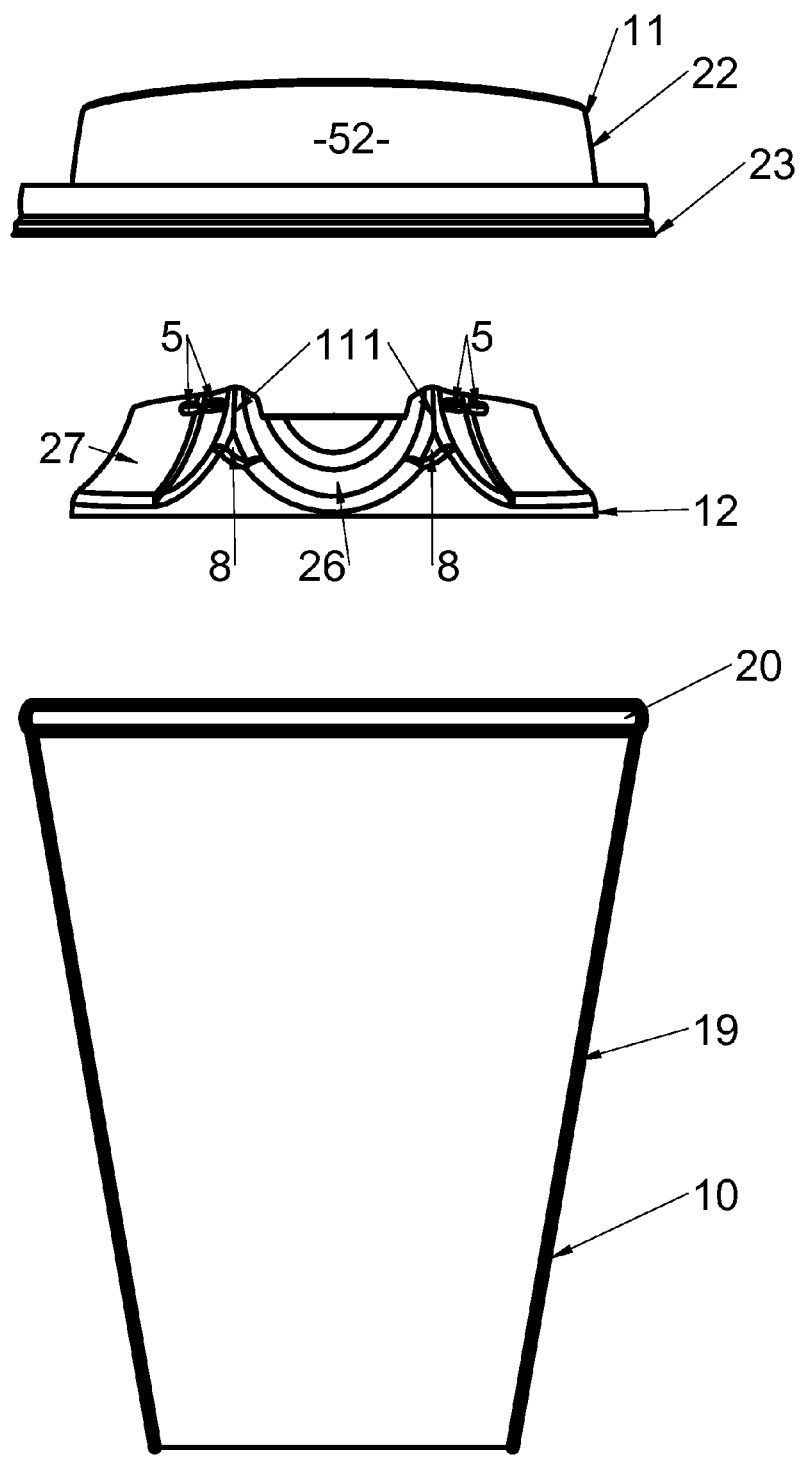
Figure 20:
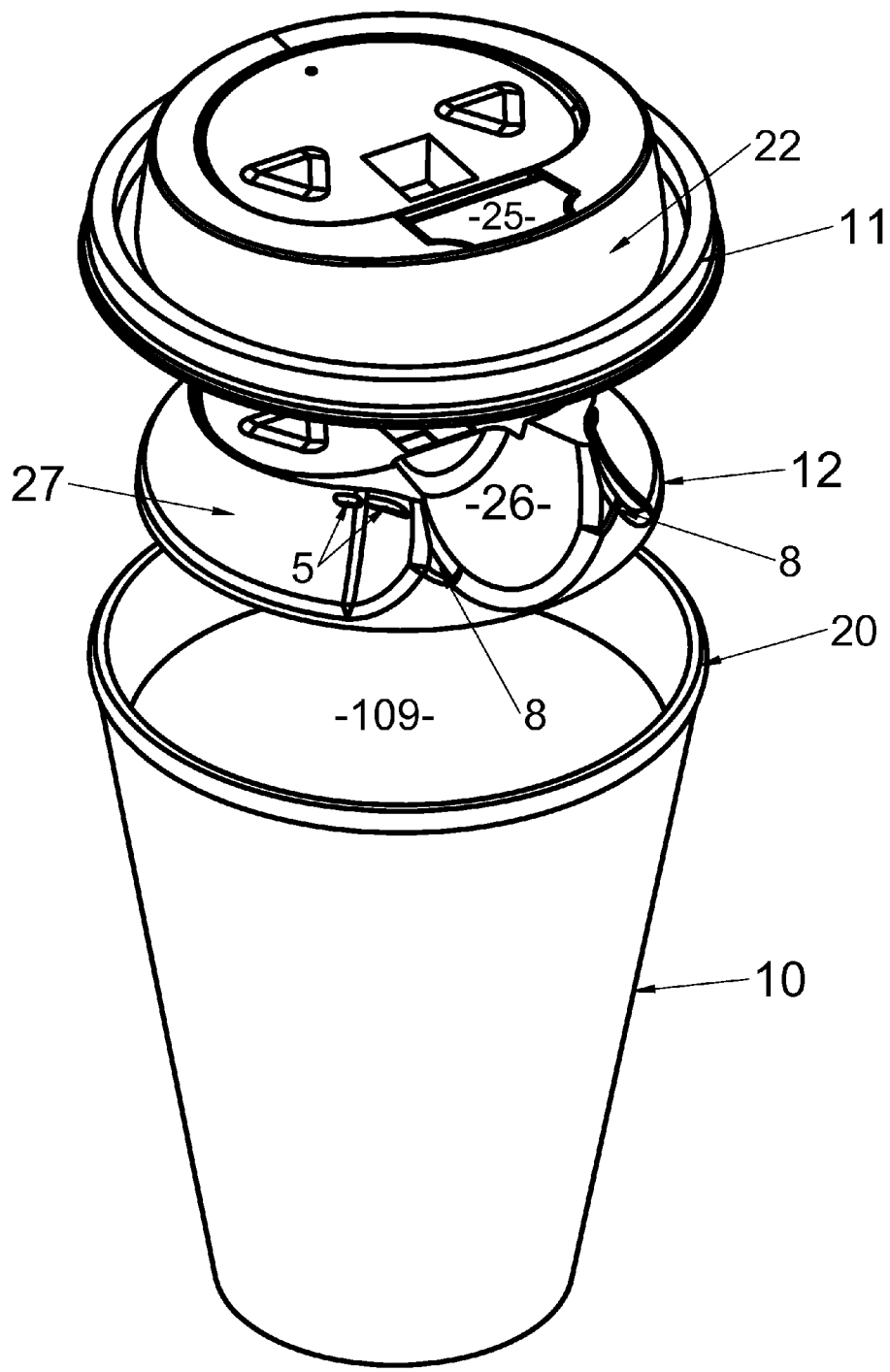
Figure 21:
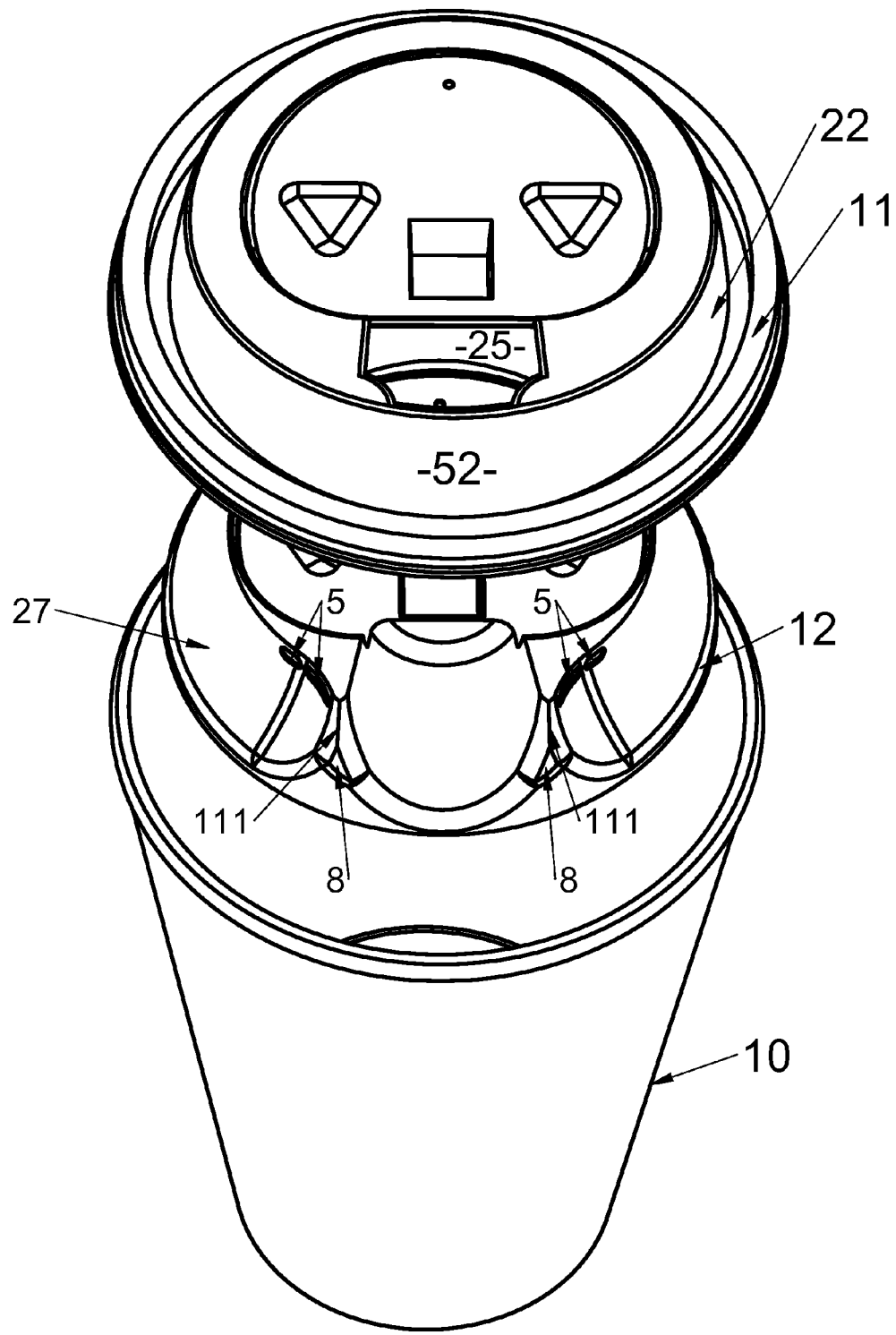

FIGS. 1-4(a) primarily depict hot liquid flow dynamics and functions of damming structure and highlights the cooling channel as at reference numeral 4 of the preferred lid-insert combination or structural embodiment, which preferred embodiment is further generally depicted in FIGS. 13-21. FIGS. 5-9 show hot liquid flow dynamics and function of a slightly modified preferred embodiment as compared to the preferred embodiment otherwise depicted in FIGS. 1-4(a) and 13-21. FIG. 10 primarily shows or depicts heat 100 passing of transferring from hot liquid trapped in the cooling channels/cavities 4 through the outside wall 22 of the lid construction 11. FIGS. 11 and 12 comparatively show an optional stacking arrangement of the lid-insert constructions according to the present invention.

Figure 22:
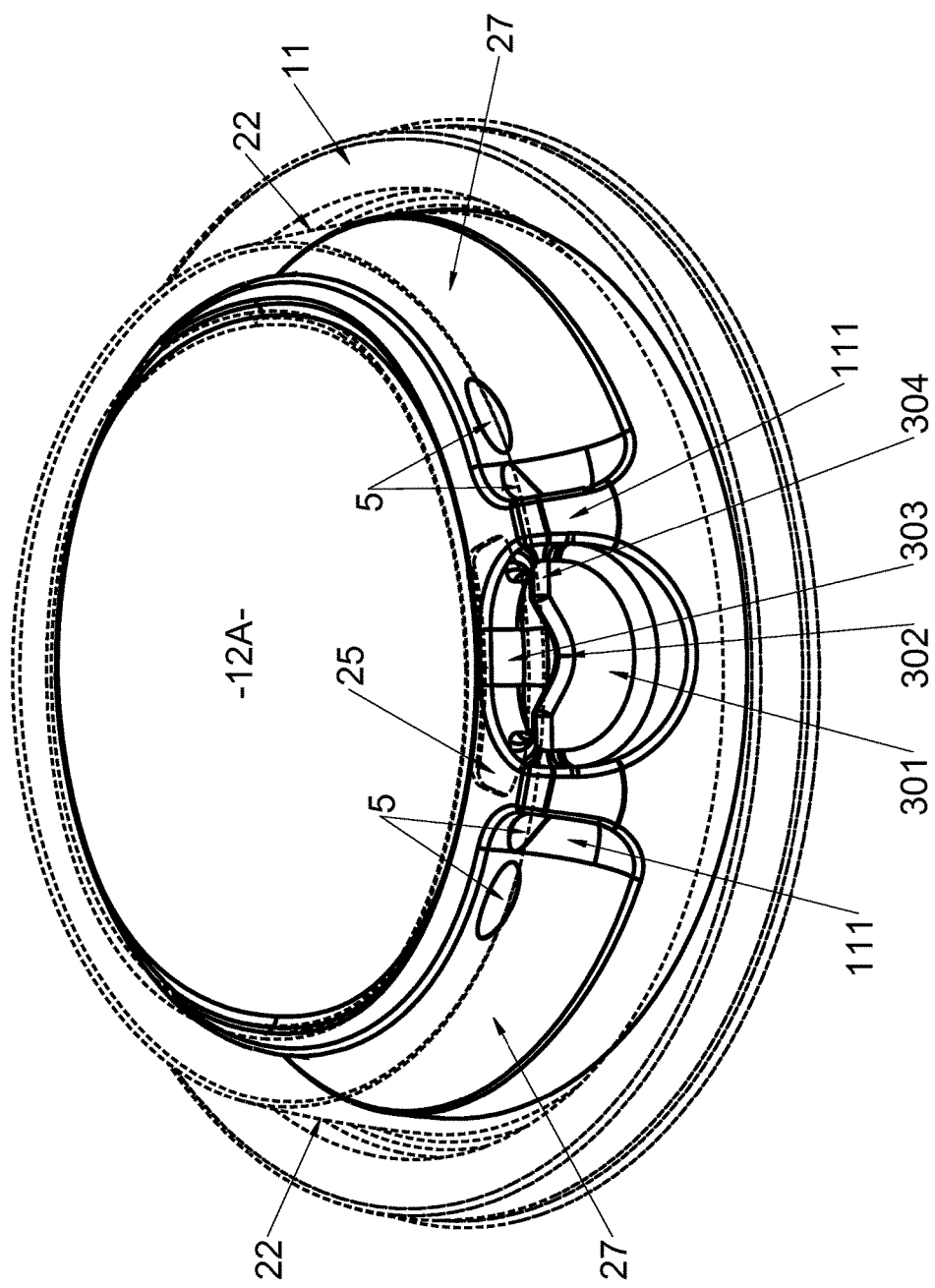
FIG. 22 is an enlarged anterior top perspective view depiction of a first alternative lid-insert combination according to the present invention, the insert portion being shown in solid lining and the lid portion being shown in broken lining.
Figure 23:
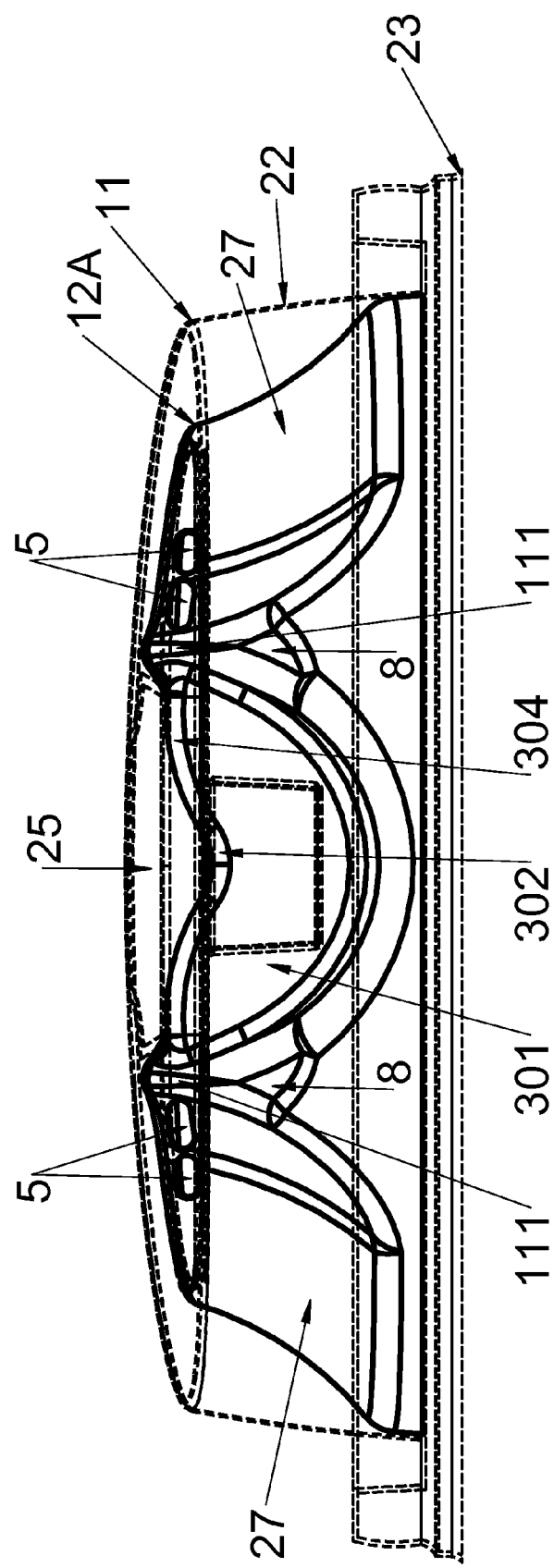
FIG. 23 is an enlarged anterior elevational view depiction of the first alternative lid-insert combination according to the present invention, the insert portion being shown in solid lining and the lid portion being shown in broken lining.
Figure 24:
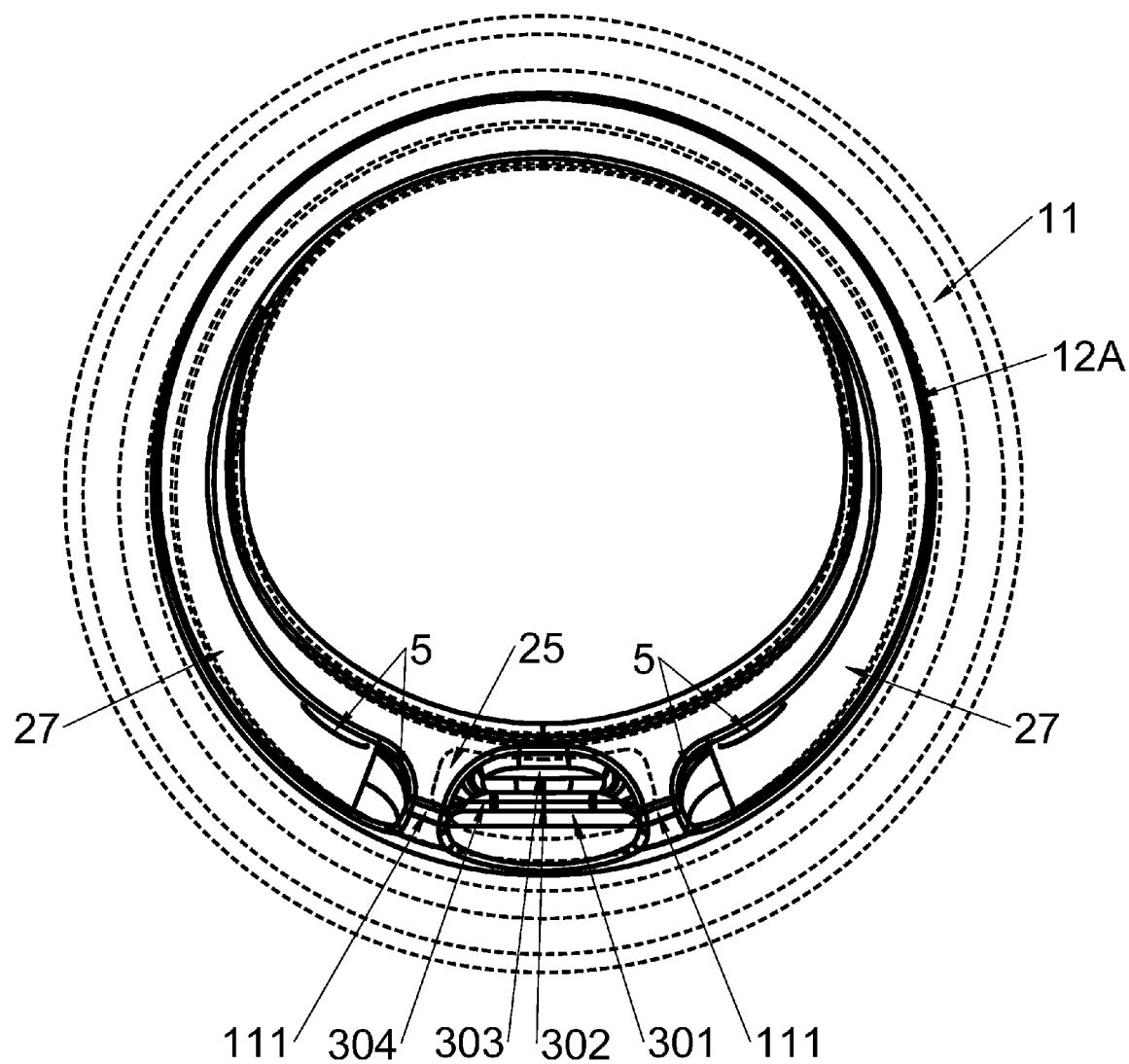
FIG. 24 is an enlarged top view depiction of the first alternative lid-insert combination according to the present invention, the insert portion being shown in solid lining and the lid portion being shown in broken lining.
Figure 25:
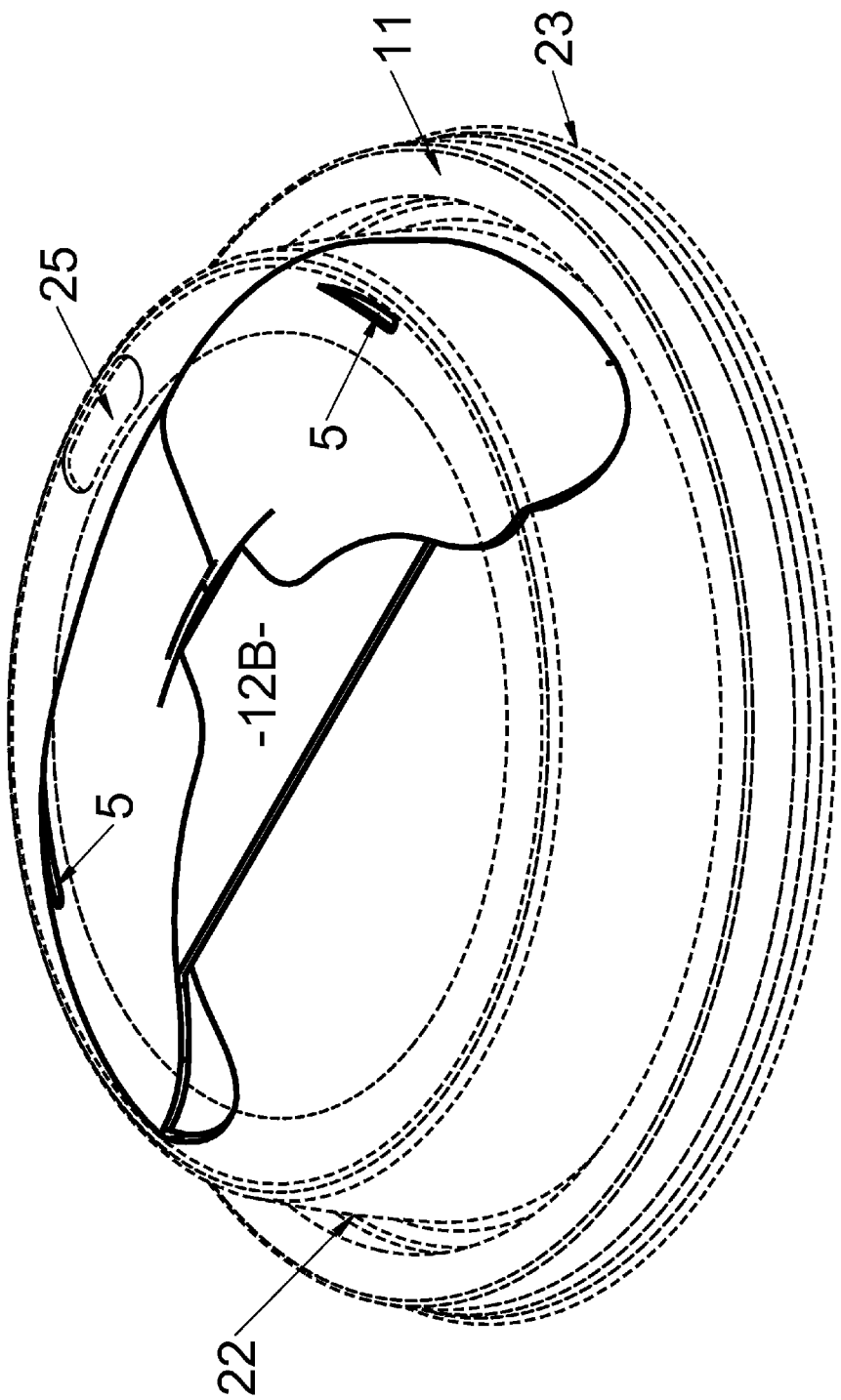
FIG. 25 is an enlarged top perspective view depiction of a second alternative lid-insert combination according to the present invention, the insert portion being shown in solid lining and the lid portion being shown in broken lining.
Figure 26:
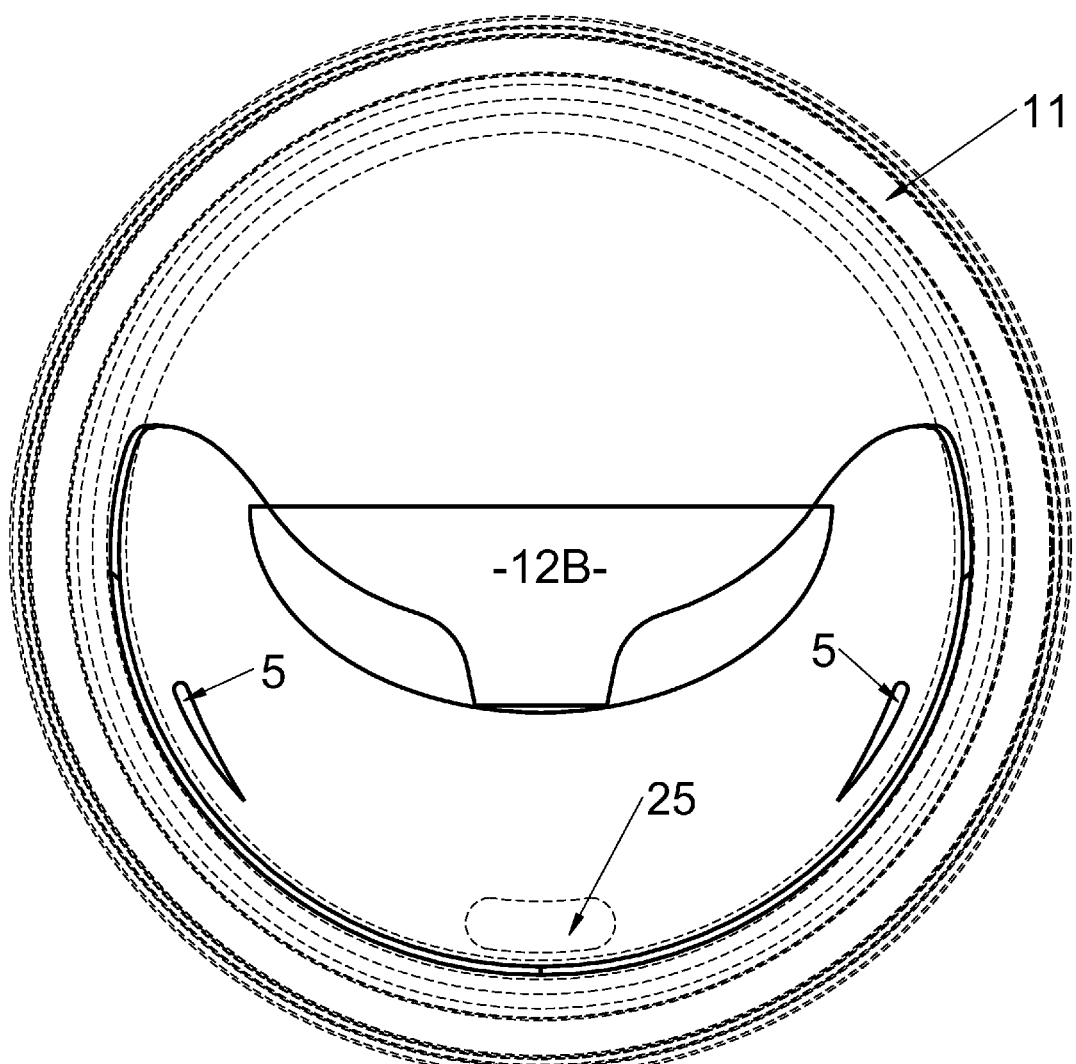
FIG. 26 is an enlarged bottom view depiction of the second alternative lid-insert combination according to the present invention, the insert portion being shown in solid lining and the lid portion being shown in broken lining.
Figure 27:
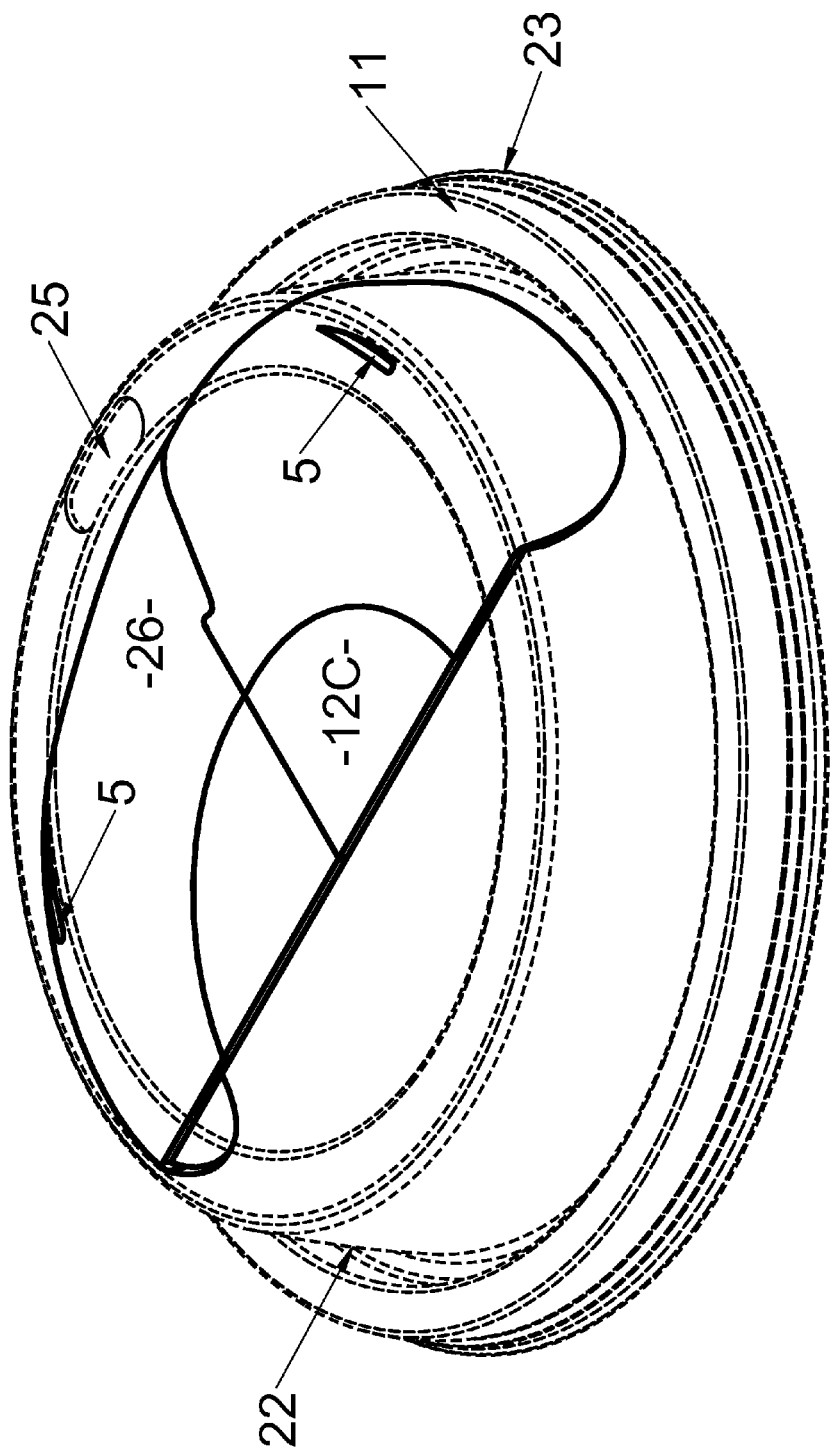
FIG. 27 is an enlarged top perspective view depiction of a third alternative lid-insert combination according to the present invention, the insert portion being shown in solid lining and the lid portion being shown in broken lining.
Figure 28:
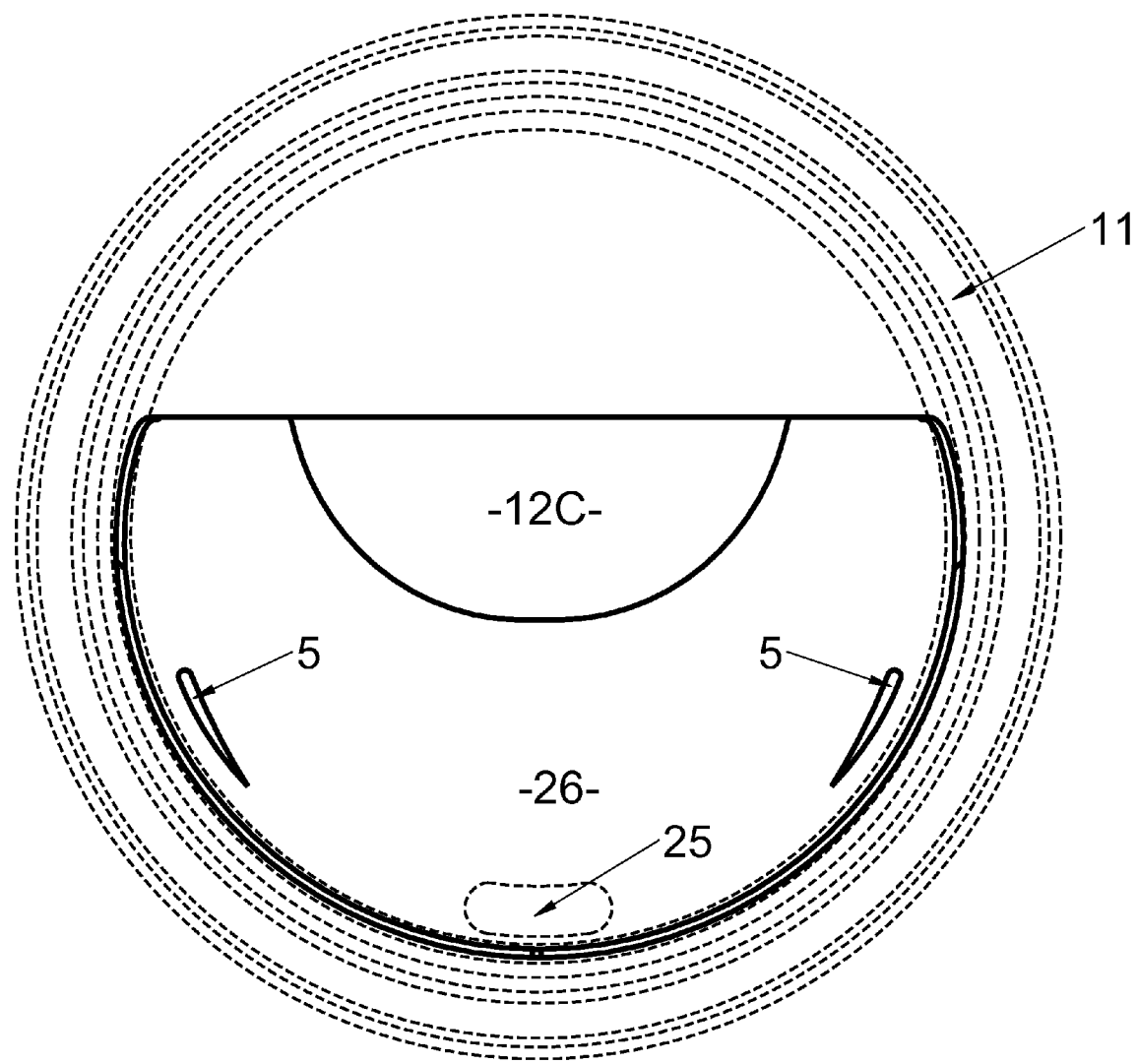
FIG. 28 is an enlarged bottom view depiction of the third alternative lid-insert combination according to the present invention, the insert portion being shown in solid lining and the lid portion being shown in broken lining.
Figure 29:
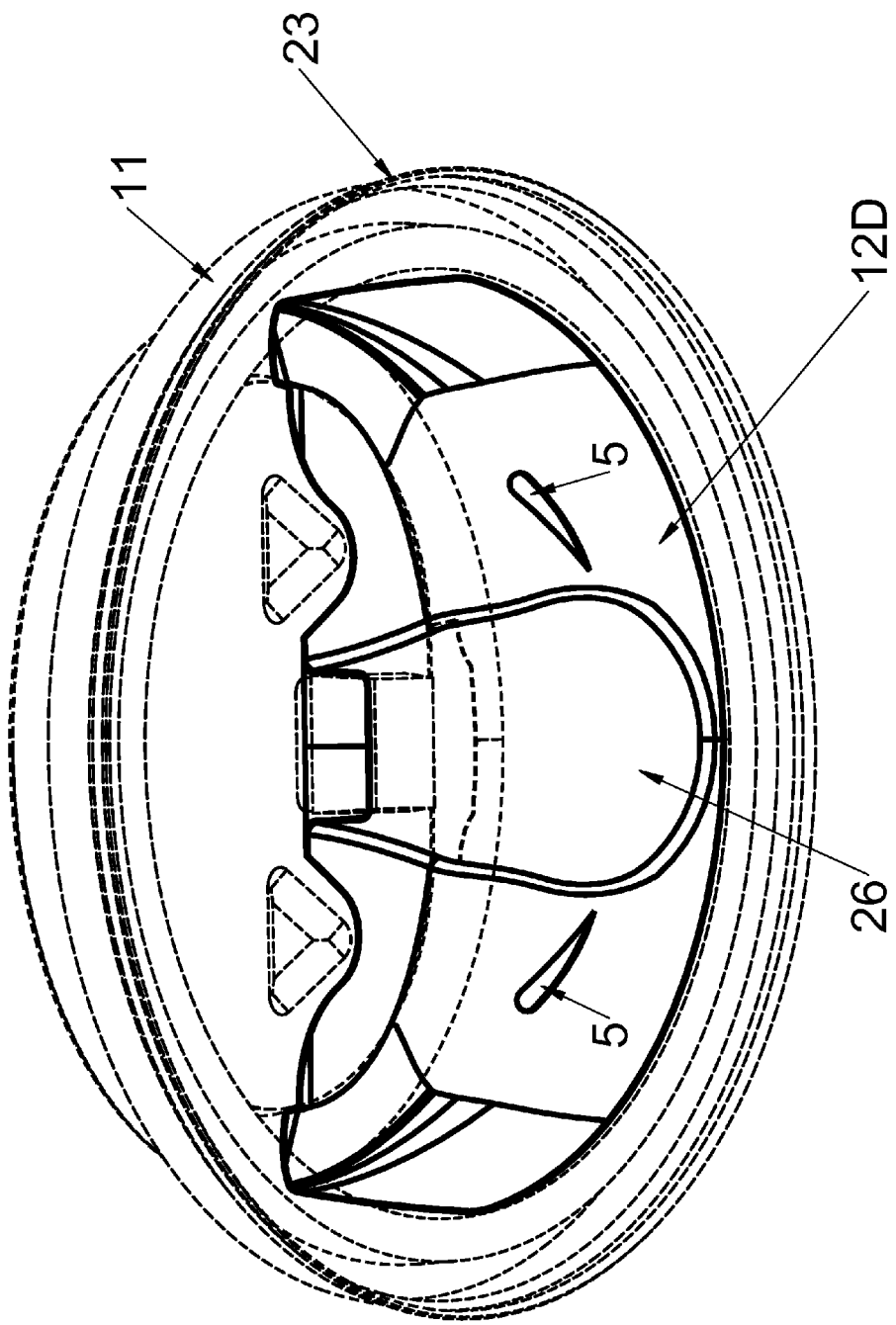
FIG. 29 is an enlarged top perspective view depiction of a fourth alternative lid-insert combination according to the present invention, the insert portion being shown in solid lining and the lid portion being shown in broken lining.
Figure 30:
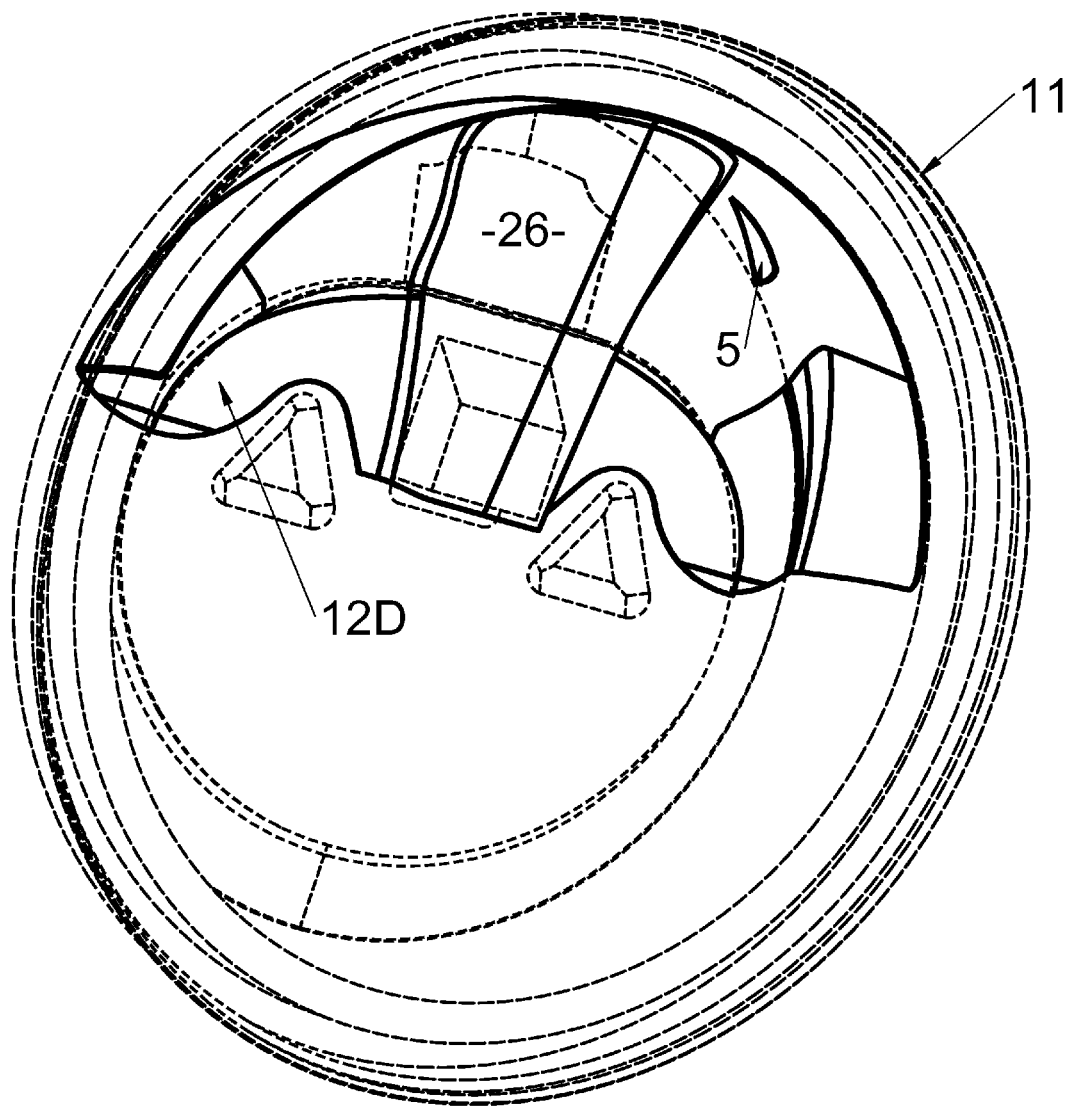
FIG. 30 is an enlarged bottom perspective view depiction of the fourth alternative lid-insert combination according to the present invention, the insert portion being shown in solid lining and the lid portion being shown in broken lining.
Figure 31:
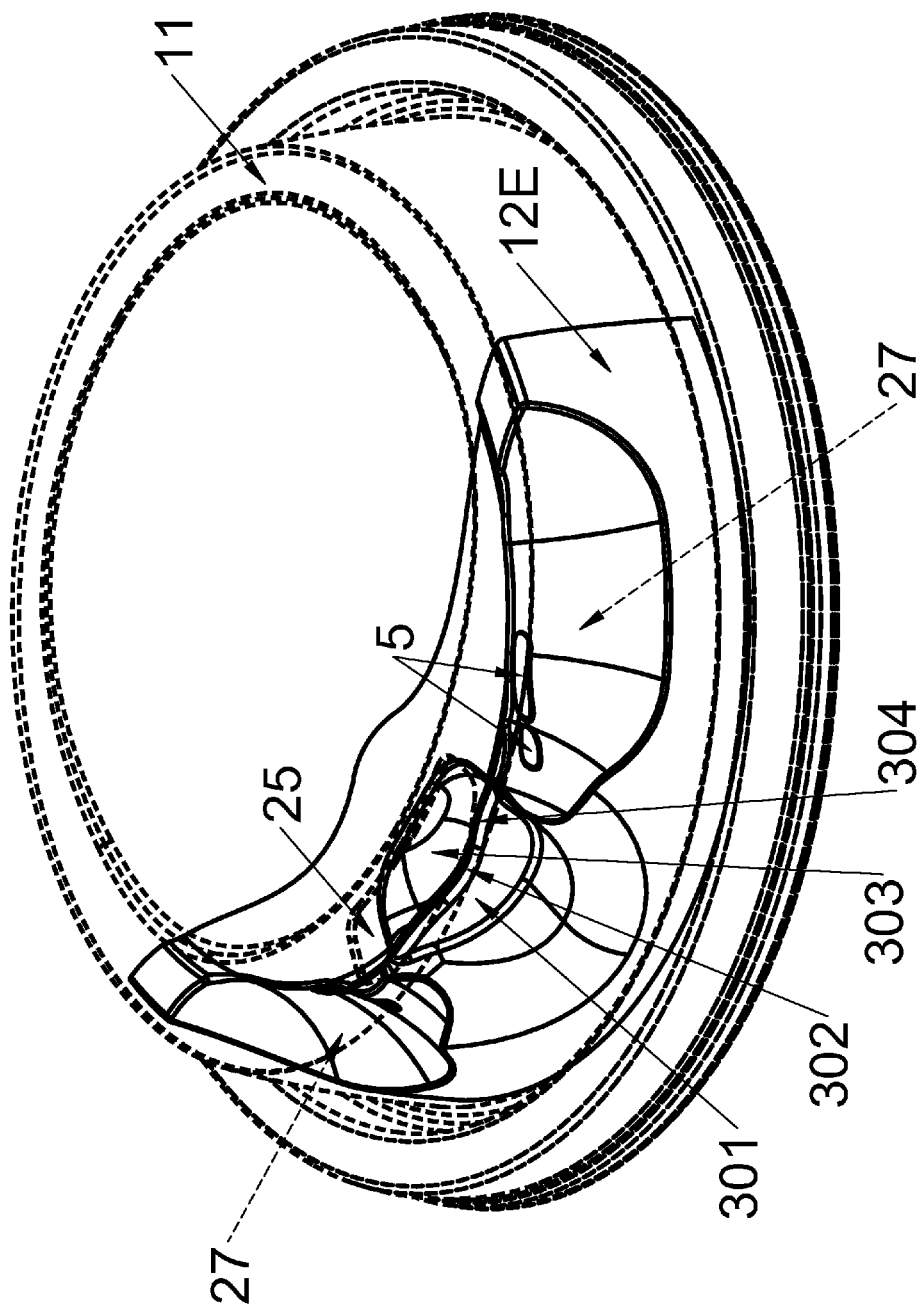
FIG. 31 is an enlarged top perspective view depiction of a fifth alternative lid-insert combination according to the present invention, the insert portion being shown in solid lining and the lid portion being shown in broken lining.
Figure 32:
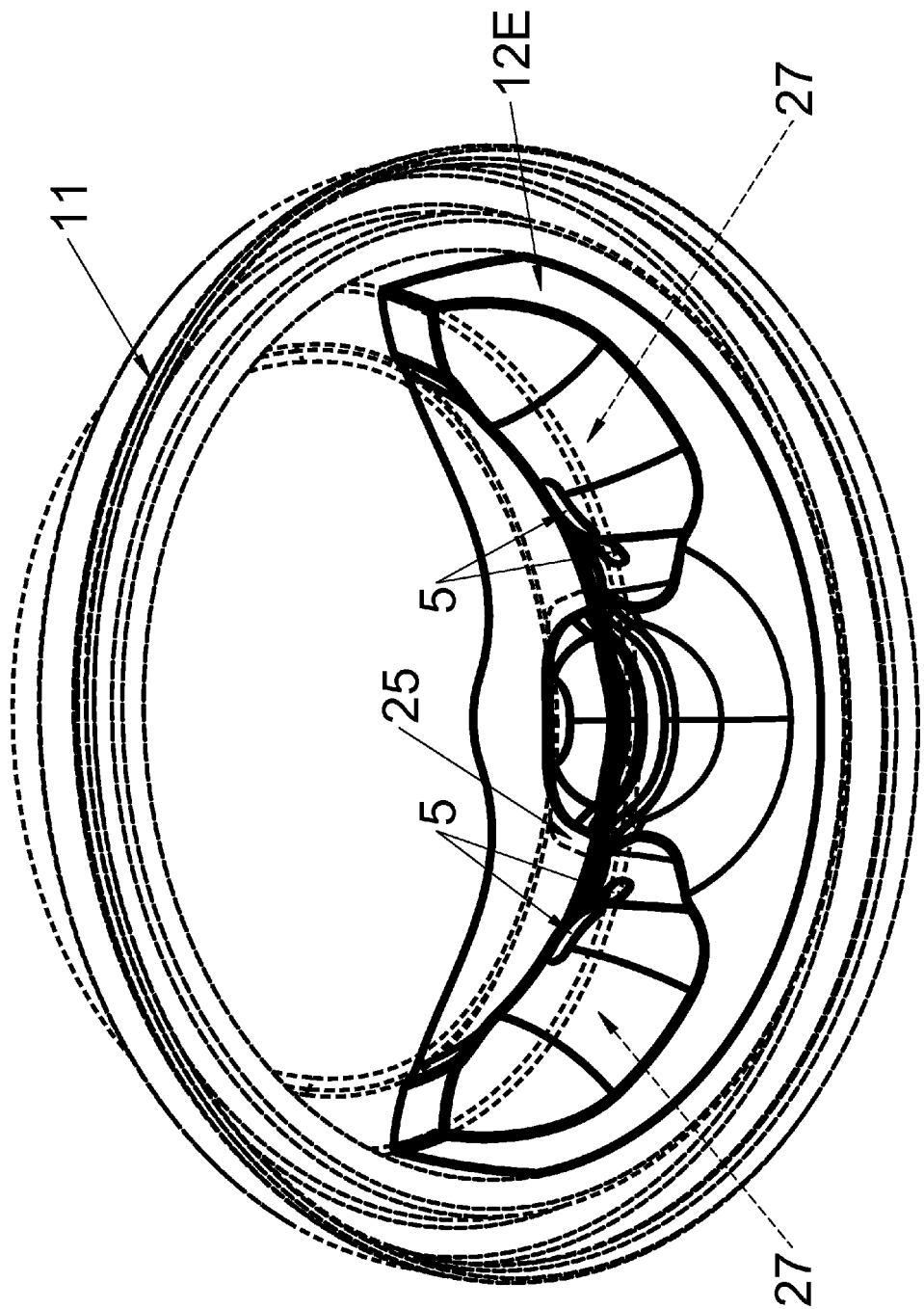
FIG. 32 is an enlarged bottom perspective view depiction of the fifth alternative lid-insert combination according to the present invention, the insert portion being shown in solid lining and the lid portion being shown in broken lining.

In this last regard, the reader will please consider FIGS. 22-24, which figures depict a first alternative embodiment according to the present invention. The first alternative embodiment basically eliminates the cooling chamber 106 defined by bowed portion 26 by adding an airflow bridge structure as at 301, which bridge structure 301 extends across cooling compartment 106 defined inferiorly by bowed portion 26. The first alternative embodiment attempts to provide all the benefits of the preferred embodiment but has better stackability. The air intake space as referenced at 303 is more akin to an indentation as opposed to a chamber. The low point or airflow trough or valley 302 is situated at a point below the top ridge 304 of the bridge structure 301. An optimized alternative of this first alternative embodiment is the fifth alternative embodiment otherwise depicted in FIGS. 31 and 32.

The alternative embodiments depicted in FIGS. 25-32 primarily represent optimized options to lower manufacturing costs or material costs during the manufacturing process of the lid-insert combinations without sacrificing significant functionality. The frontal or anterior portions of the insert constructions provide the most functionality and benefits, stemming primarily from the damming structure and its cooling effects. The optimized alternatives provide partial representations of the otherwise fully functional preferred embodiment(s). The fully functional preferred embodiments have added benefits of enhanced structural integrity of the lid-insert combination which leads to a stronger gripping action on the container portion as at 10 of the overall assembly.

Accordingly, when viewed in terms of an ensemble, or in combination with a hot beverage container, or as a hot beverage container assembly, the present invention is believed to comprise a container structure as at 10 and a lid-insert combination according to one of the preferred or alternative embodiments disclosed in these specifications. The lid-insert combination is believed to comprise a lid structure or construction as at 11, and an insert structure or construction as generally depicted and referenced at 12. The essential container structure 10 is believed to preferably comprise a container bottom, a container wall as at 19, and an upper container rim as at 20. The upper container rim 20 has a rim perimeter, which rim perimeter preferably extends in a rim plane.

The basic lid structure or construction 11 is believed to preferably comprise a lip top 21, a lid wall 22, and a lower lid rim 23 having a container rim-receiving groove 24. Thus, the lower lid rim 23 receives or is otherwise attachably cooperable with the upper container rim 20. The lid top 21 preferably comprises a primary beverage outlet as at 25 at or adjacent a peak 210 of the lid top 21, which primary beverage outlet 25 may be of various sizes and configurations. It is contemplated, for example, that the outlet 25 may be circular of differing diameters. Other outlet shapes are contemplated, however, such as oval outlets or generally rectangular outlets.

The size and shape of the primary outlet 25 is not believed critical to the practice of the present invention, although it is noted that larger primary outlets 25 tend to outlet beverage or liquid flow (as at 7') at a greater rate and thus may more readily subject users/drinkers to scalding should the assembly-contained beverage 101 be injuriously hot. The present invention is thus believed particularly designed for basic lid structures or constructions 11 having relatively large primary beverage outlets 25.

Central to the practice of the present invention are the various insert constructions as alternatively referenced at 12, 12A, 12B, 12C, 12D, and 12E of the lid-insert combination. In this regard, it is contemplated that the insert constructions 12-12E may be preferably integrally formed with the basic lid construction 11, or may be separately adhered thereto as an alternative for forming a relatively more complex lid construction. The preferred insert structure or construction 12 preferably comprises a beverage-damming structure or portion as at 111 and an outer rim-engaging structure or periphery. The insert construction 12 is contemplated to be preferably formed from a thermally-insulative, food-grade, and heat-resistant material.

In this last regard, it is contemplated that the material should undergo minimal or minimized structural/dimensional changes when heat 100 is transferred into the material. The beverage-damming structure 111 is preferably sized and shaped for receipt within the rim perimeter and, being received, comprises a downwardly extending bowed portion as at 26 and an insert wall-based groove or groove-shaped wall as at 27.

The wall-based groove or groove-shaped wall 27 defines an annular peripheral beverage-receiving or liquid-cooling cavity or channel as at 4 located intermediate the insert construction(s) 12 and the basic lid construction 11 for directing hot beverage 101 into said channel 4 for effecting heat transfer 100 from the hot beverage 101 through the material of the insert construction(s) 12 and lid construction 11 radially as generally depicted in FIGS. 3 and 10. The annular channel 4 and radial heat transfer 100 effected by the beverage-receiving channel 4 is believed to enhance and/or expedite heat transfer 100 from the hot beverage 101 prior to exiting the primary beverage outlet 25.

The channel formation 4 is preferably of an annular shape or configuration thereby minimizing the cross-sectional area of channel-received liquid for increasing the rate of heat transfer 100 therefrom as compared to structural pooling characteristics taught by the liquid-cooling chambers or compartments taught by Milan in U.S. Pat. No. 6,488,173 ('173 patent). The present invention attempts to direct or channel hot beverage liquid into the interstices between wall portions of the upper or outer basic lid construction and the lower or inner insert construction(s) for effecting radially directed heat transfer from minimized liquid quantities directed into the channel formation(s) 4.

The downwardly extended bowed portion 26 extends radially inwardly from the lid wall 22 partially across the diameter of the lid element or construction 11 in inferior adjacency to the primary beverage outlet 25 generally located at a peak 210 of the lid top 21, which lid top 21 may be optionally obliquely angled relative to the lower lid rim 23. A lower lid portion 211 of the optionally and obliquely angled lid top 21 extends in the direction opposite the peak 210. In other words, the container lid-insert combination according to the present invention comprises bowed portion 26 that extends inwardly from the lid perimeter, the bowed portion 26 extending partially across the diameter of the lid construction 11 in inferior adjacency to the primary beverage outlet 25.

This construction or general design feature enables the lid-insert combination(s) 11-12 to be stackable in a series of successive container lid-insert combinations 11-12 as generally and comparatively depicted in FIGS. 11 and 12. Referencing FIGS. 11 and 12, the reader will note that the bowed portions 26 of a first set of container lid-insert combinations 11-12 extend downwardly in superior adjacency to the lower lid portion 211 of the obliquely angled lid top 21 of a second set of container lid-insert combinations 11-12. Accordingly, the series of successively stacked container lid-insert combinations 11-12 thus reduce stacked space for packaging and lid delivery purposes.

The series of stacked lid-insert combinations 11-12 further function to effect a "pop-up" type packaging effect that pops or resiliently relaxes from the actuated state as generally depicted in FIG. 12 to a relaxed state as generally depicted in FIG. 11. In this regard, the reader will note that an upper edge or peak 210 of a first lid top 21 engages the back wall 212 of a second lid top 21 such that the back wall 212 may elastically deform under compressive forces as at 115. When the compressive forces 115 are removed, the stack 117 decompresses as at arrows 122. During decompression, the back wall 212 relaxes and the series of stacked container lid-insert combinations 11-12 pop back (as at up arrows 121) to the configuration generally depicted in FIG. 11, which configuration provides a lid-grabbing space as at 116 so that users may more easily and readily grab a single lid-insert combination 11-12 from the stack 117.

It will thus be seen that the insert-outfitted container lid constructions or combinations 11-12 may be preferably stacked into nested columns or stacks 117, which nested columns or stacks 117 naturally have some inherent spring characteristic of their own based on the collective resiliency of the resilient wall 212 constructions. When in a compressed state, the columns or stacks 117 and certain force maintenance means (as may be defined or exemplified by certain packaging) operate to keep or force (as at vectors 115) the lid-insert constructions or combinations 11-12 in the actuated configuration as generally depicted in FIG. 12.

In other words, the columns or stacks 117 are preferably maintained in the compressed state by virtue of certain packaging parameters or means. When the force maintenance means are released from the columnar or stacked formations 117, the container lid insert constructions 11-12 automatically return to their relaxed configurations as generally depicted in FIG. 11, and the stacked columnar formations 117 become decompressed stacked columnar formations.

It will be noted that the beverage-damming structure(s) 111 of insert structure(s) 12 preferably comprises a series of apertures or cut-outs as generically referenced at 5. The series of apertures 5 primarily functions to outlet beverage 101 from the beverage-containing compartment as at 105 into certain beverage-cooling channels as at 4 and 8, and beverage-cooling compartment as at 106. The beverage-cooling channel 4 and formation 8 and compartment 106 receive heat 100 from the beverage 101 thereby enabling the beverage 101 to cool before being further outlet (as at 7') via the primary beverage outlet 25.

The series of apertures 5 may secondarily function, however, to inlet air from the beverage-cooling channels 4 and 8, and beverage-cooling compartment 106 to the beverage-containing compartment 105. The beverage-cooling channels 4 and 106 receive heat 100 from the beverage 101 thereby enabling the beverage 100 to cool before being further outlet via the primary beverage outlet 25. It is contemplated that the beverage-damming structure 111 slows the rate of beverage flow 7 or provides a short delay of beverage movement by temporarily trapping the beverage 101 so as to enable heat 100 transfer from the beverage 101.

The reader is directed to secondary aperture(s) or channel formations 8 created by the outward ridges of the beverage damming structure 111 and side wall 22 of the upper portion of the lid element or construction 11. These ridges extended forward specifically to decrease diameter or size of the openings or channel formations 8 and to slow beverage flow or provide delayed delivery of hot liquid or beverage 101 for effecting heat transfer from the hot liquid or beverage 101 from primary apertures 5 to the primary beverage outlet 25.

In general the primary apertures 5 and the secondary apertures or channel formations 8 cooperate such that the primary apertures 5 enable letting of relatively larger volumes of hot liquid or beverage 101 because hot liquid or beverage 101 enters therethrough under greater "pressure" as the hydraulic force of larger volumes of hot liquid or beverage 101 from the main compartment 105 creates greater "pressure". After the hot liquid or beverage 101 has passed through the main apertures 5, the hot liquid or beverage flows or is directed as at arrows 120 by gravitational force and much lower pressure to the secondary apertures or channel formations 8.

The relatively smaller diameter or sized secondary apertures or channel formations 8 create a trapping or damming effect, which allows portions of the hot liquid or beverage 101 to be trapped in cooling channel 4 with relative low volumes being able to pass through the secondary apertures or channel formations 8. The apertures or channel formations 8 further create a micro cooling effect by differential pressure.

While, minimal, the micro cooling effect adds to a total cumulative cooling effect. Further, the secondary cooling channel as at 4 in this particular embodiment acts as air intake compartment. Moving air passes hot beverage 101 within the channel 4 and cools down the hot beverage 101 and enhances taste of hot beverage 101. In summary, channel formation 8 may preferably comprises a transverse cross-sectional area relatively lesser than the transverse cross-sectional area of channel formation 4 to achieve the foregoing affect(s).

The delay in beverage delivery is important not only for letting liquid progress through the beverage cooling channels or formations 4/8, but is also no less important for enabling the drinker to start inhaling air before the hot liquid approaches the main opening or primary beverage outlet 25. In practice, hot liquid, progressing through the interstices or formations 4/8 of the complex lid construction, comes into contact with air currents created by inhaled airflow(s) created by the drinker thereby decreasing the likelihood of hot liquid coming first into contact with the drinker's anatomy before it mixes with the airflow. This type of dynamic is particularly important when the drinker may otherwise experience difficulty in finely controlling liquid outflow(s), as would be the case, for example, during times of simultaneous driving or walking activities. Moreover, the practice of firstly inhaling air and contacting the inhaled air up with flows hot liquid or beverage may effectively enhance the taste of hot beverage by enabling a greater sense of aroma to be present.

When the lid structure 11, container structure 10 and insert structure(s) 12 are assembled, the apertures 5 enable the user to control beverage flow 7 rates by selectively angling the beverage container assembly relative to the horizon or beverage surface 109. A comparative inspection of the figures will illustrate for the reader that together the beverage damming structure 111 and beverage-permeating means (as exemplified by apertures 5), operate to slow the beverage flow 7 rate or otherwise provide a short delay to beverage movement before exiting the primary beverage outlet 25 for enabling heat 100 to transfer from the hot beverage 101 within the beverage-cooling channels 4 and 106.

Referencing FIGS. 1-1(a), the reader will consider hot beverage 101 contained in the beverage container 10 having a container wall 19 and a container rim 20. A lid construction 11 is outfitted with an insert construction 12 thereby forming a lid-insert combination. The lid-insert combination is assembled atop the beverage container 10 via rim 23 thereby forming a beverage-containing compartment 105.

FIG. 2 is a second sequential longitudinal cross-sectional depiction of a preferred lid-insert combination according to the present invention assembled atop the beverage container 10, showing the lid-insert combination-outfitted beverage container 10 in a first angled orientation for outletting beverage flow 7 of the beverage 101 from the container 10 into beverage-cooling channel formations 4 and 8 via apertures 5 formed in the insert construction 12. Hot beverage 101 is trapped in the cooling channel formations 4 and 8 thereby engaging both the outer wall 22 of the lid construction 11 and the inner wall 27 of the damming insert construction 12, and heat 100 passes through these walls 22 and 27 for cooling down hot beverage or liquid 101 for consuming the liquid exit flow 7'.

FIGS. 3 and 3(a) show the outfitted beverage container 10 in a second vertical orientation for allowing beverage 101 received in the beverage-cooling channels 4 and 8 of the lid-insert combination to radially transfer heat 101 via the walls 22 and 27. The outfitted container assembly is then angled a second time directing as at arrows 120 liquid flow 7 prior to consumption via liquid exit flow 7' via the primary beverage outlet 25 as generally depicted in FIGS. 4 and 4(a).

FIG. 3(b) depicts an interstitial liquid-cooling channel interstitially defined by at least a radially outward first wall as at wall 22 and a radially inward second wall as at wall 27. It will be seen that the radially inward second wall is non-uniformly spaced from the radially outward first wall and thus that the interstitial liquid-cooling channel comprises a number of differently spaced zones, including a central zone of maximum spacing as at 60 underlying the primary beverage outlet as at 25; laterally offset minimum spacing zones as at channel formations 8 laterally adjacent to the central zone of maximum spacing 60; laterally offset moderate spacing zones as at 61 laterally adjacent to the laterally offset minimum spacing zones 8; and a zone of uniform spacing as at 62 interconnecting the laterally offset moderate spacing zones 61.

The non-uniformly spaced radially inward and outward first and second walls are together cooperable with the obliquely angled interstitial liquid-cooling channel for (a) creating a pressure differential within the interstitial liquid-cooling channel as liquid (e.g. beverage) travels toward the primary beverage outlet 25 and (b) trapping or delaying liquid travel via the pressure differential within the liquid-cooling channel. The interstitial beverage-cooling or liquid-cooling channel thus directs liquid from the liquid-containing compartment to the primary beverage outlet and transfers heat therefrom before the liquid exits the primary beverage outlet.

While the foregoing specifications set forth much specificity, the same should not be construed as setting forth limits to the invention but rather as setting forth certain preferred embodiments and features. For example, as prefaced hereinabove, it is contemplated that the present invention essentially provides a lid insert construction for building a lid-insert combination or complex lid construction and thus providing a hot beverage container assembly for enabling a user to transfer heat from a relatively hot assembly-contained beverage prior to consumption.

Viewed systemically, or from an ensemble point of view, the invention may be said to preferably comprise, in combination, a beverage container as at 10, a lid construction as at 11, and an insert construction as generically referenced at 12. A first alternative insert construction is referenced at 12A, a second alternative insert construction is referenced at 12B, a third alternative insert construction is referenced at 12C, a fourth alternative insert construction is referenced at 12D, and a fifth alternative insert construction is referenced at 12E.

The lid construction 11 preferably comprises a primary beverage outlet as at 25, and the insert construction(s) 12 (i.e. 12, 12A, 12B, 12C, 12D, and/or 12E) are preferably sized and shaped for attachment to the lid construction 11 for defining a lower beverage-containing compartment as at 105 and at least one upper beverage-cooling channel as at formations 4 and/or 8. The insert construction(s) 12 preferably comprise a downwardly extended primary dam structure or portion 111. The primary dam structure 111 is located in inferior adjacency to the primary beverage outlet 25 for redirecting beverage movement as it moves from the beverage-containing compartment 105 to the at least one beverage-cooling channel or formation as at 4 and 8, or compartment 106.

Each beverage-cooling channel defined by the insert construction(s) thus receives heat or effects a heat transfer from the beverage 101 before said beverage 101 exits the primary beverage outlet 25. The primary dam structure thereby provides certain beverage-redirection means for enabling the user to redirect beverage movement via the lid and insert constructions 11 and 12 for (a) delaying beverage delivery via the primary beverage outlet and (b) transferring heat 100 therefrom prior to beverage consumption.

A downwardly extended portion 26 preferably extends (a) inwardly from an insert perimeter, and (b) partially across the diameter of the lid construction 11 in inferior adjacency to the primary beverage outlet 25. The channel formations 4 and 8 together may be said to define a peripheral beverage-receiving channel intermediate the insert construction(s) 12 and the lid construction 11 for directing hot beverage into said channel for effecting radially directed heat transfer as at 100 from the hot beverage through walls (e.g. walls 22 and 27) of the insert and lid constructions 12 and 11. The radially directed heat transfer as at 100 effected by the beverage-receiving channel is believed to enhance heat transfer from the hot beverage prior to exiting the primary beverage outlet 25.

The beverage-redirection means according to the present invention may be exemplified by primary and secondary apertures. The primary apertures (as at 5) function primarily for outletting hot beverage 101 from the beverage-containing compartment 105 into the at least one beverage cooling channel as at formation 4, and the secondary apertures as at aperture or formation 8 redirect beverage movement between beverage-cooling channels for enhancing the heat transfer characteristics of the hot beverage container assembly, lid-insert combination, or insert construction(s) 12.

Figure 5:
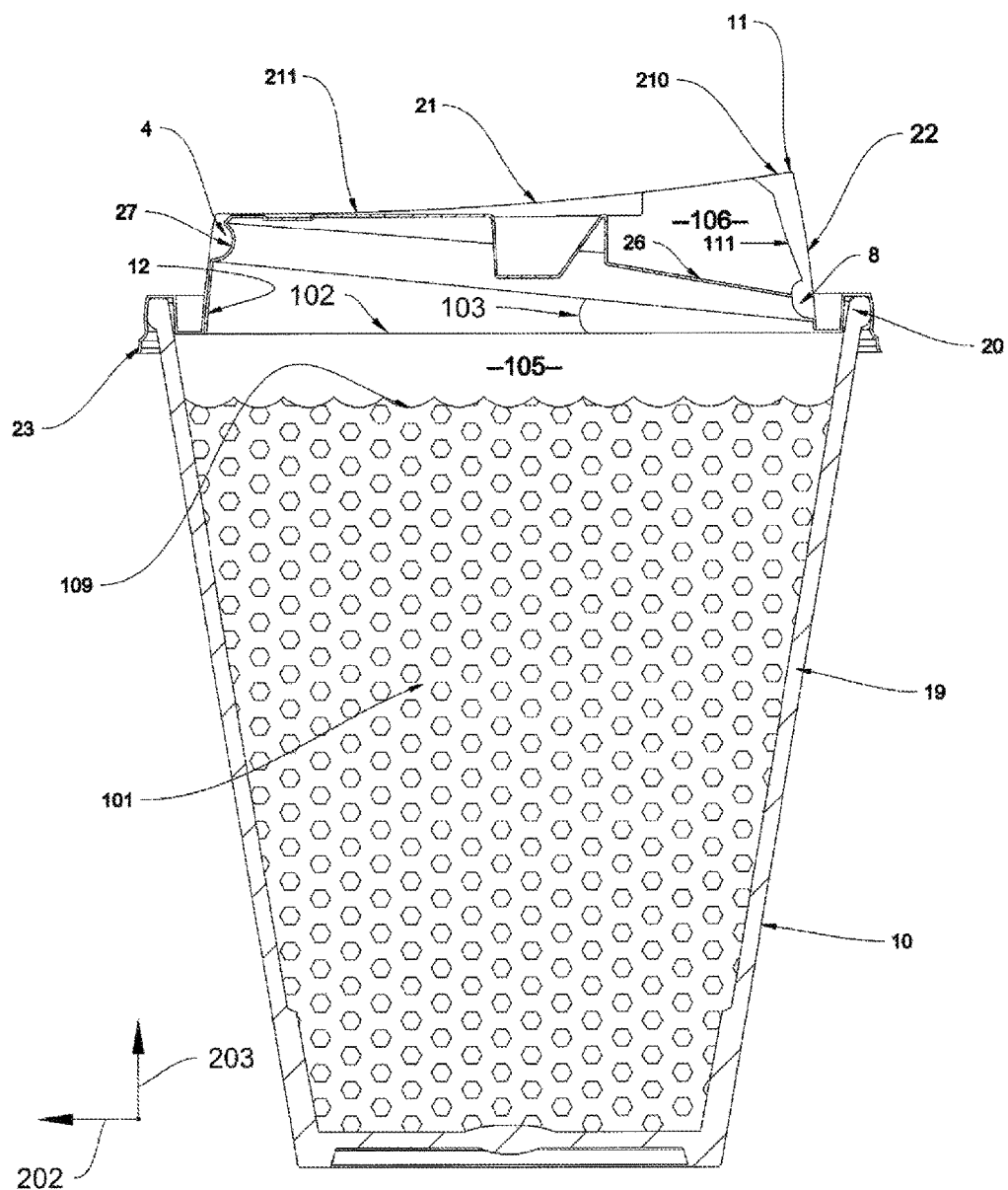
FIG. 5 is an enlarged, first sequential longitudinal cross-sectional depiction of a slightly modified preferred lid-insert combination according to the present invention assembled atop a beverage container holding a hot beverage and showing the outfitted beverage container in a vertical orientation before being angled a first time.
Figure 6:
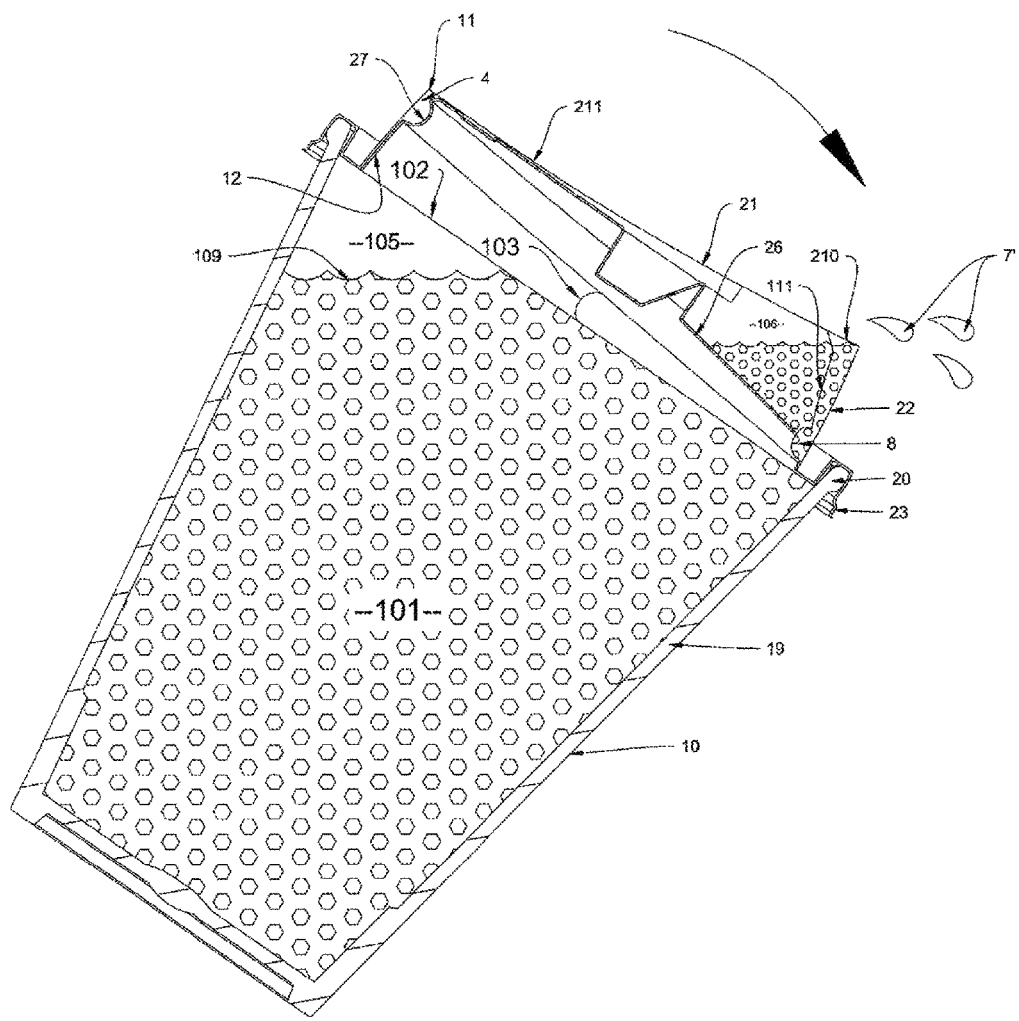
FIG. 6 is an enlarged, second sequential longitudinal cross-sectional depiction of the slightly modified preferred lid-insert combination according to the present invention otherwise depicted in FIG. 5 assembled atop a beverage container holding a hot beverage and showing the outfitted beverage container in an angled position for outletting beverage from the primary beverage outlet.
Figure 7:
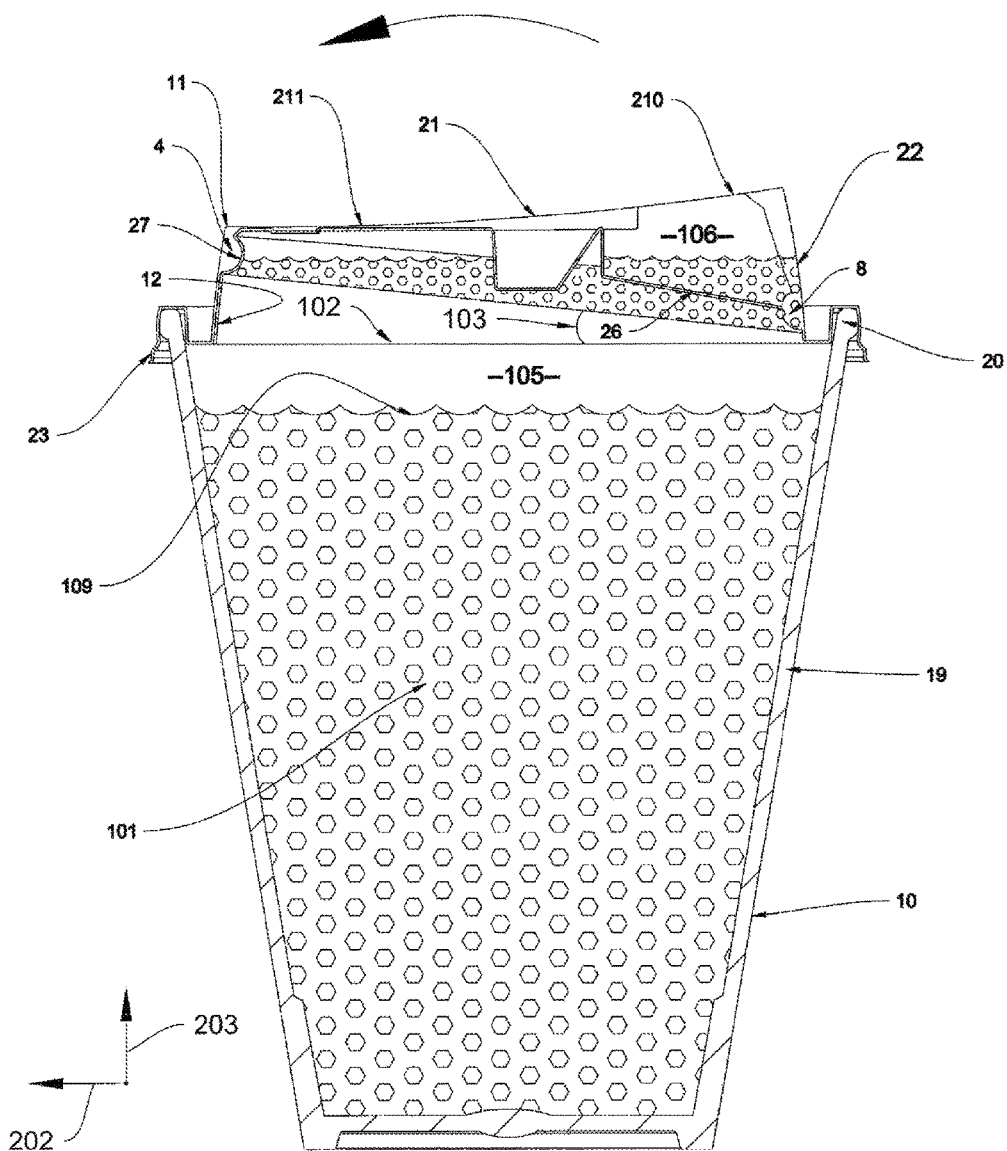
FIG. 7 is an enlarged, third sequential longitudinal cross-sectional depiction of the slightly modified lid-insert combination according to the present invention assembled atop a beverage container holding a hot beverage and showing the outfitted beverage container in a vertical orientation with hot beverage received in beverage cooling channels of the lid-insert combination.
Figure 8:
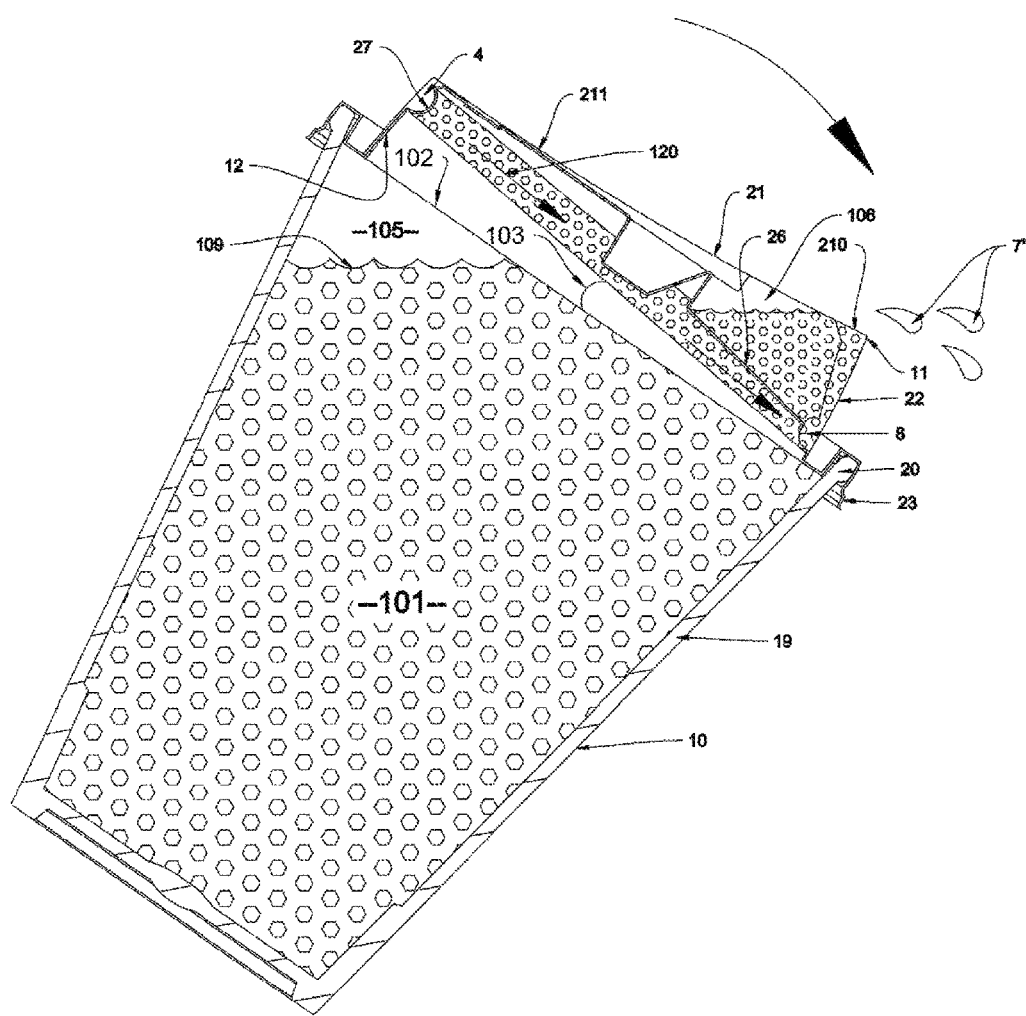
FIG. 8 is an enlarged, fourth sequential longitudinal cross-sectional depiction of the slightly modified lid-insert combination according to the present invention assembled atop a beverage container holding a hot beverage and showing the outfitted beverage container in an angled position for outletting beverage from the primary beverage outlet and directional arrows depicting beverage movement according to the angled position.
Figure 9:
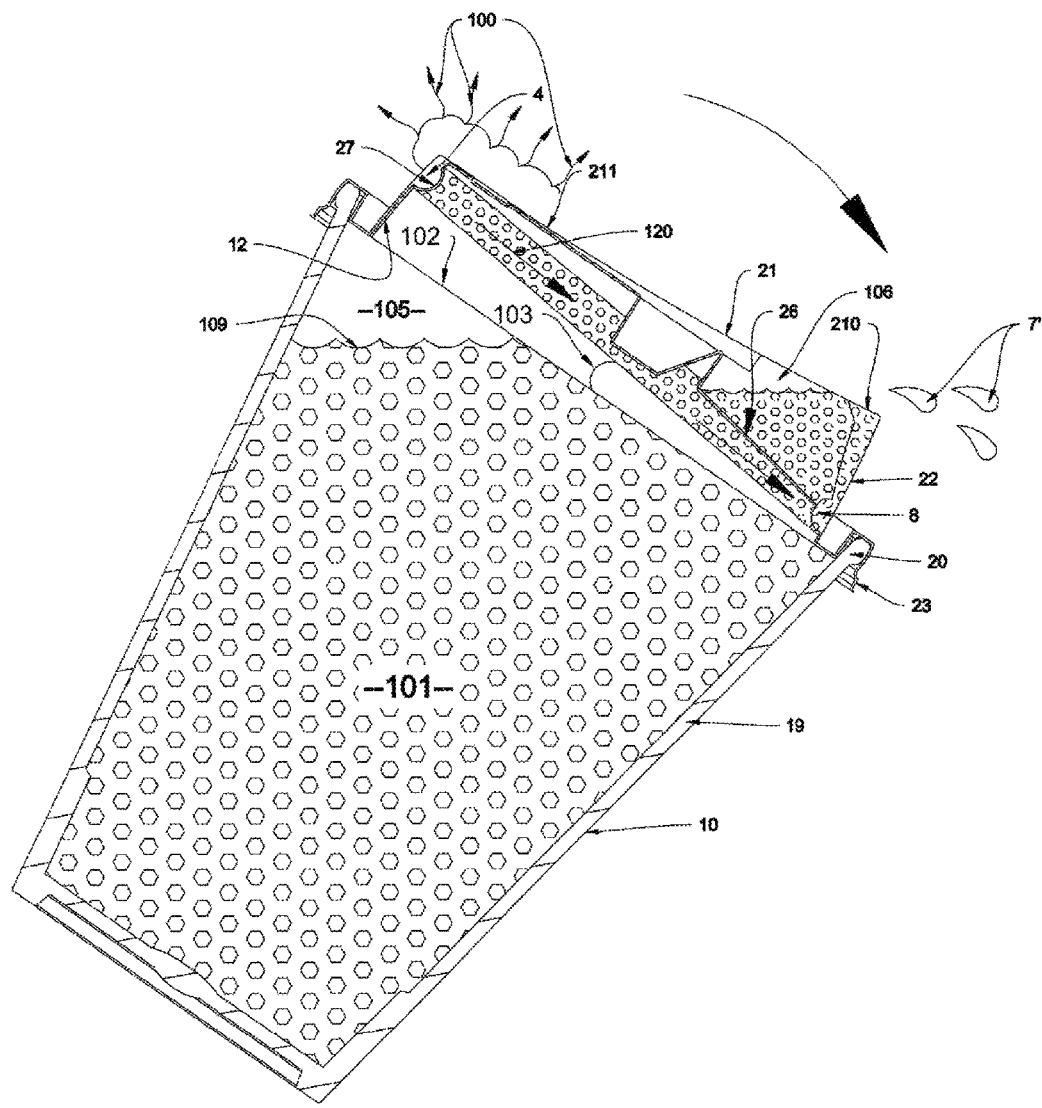
FIG. 9 is an enlarged, fifth sequential longitudinal cross-sectional depiction of the slightly modified lid-insert combination according to the present invention assembled atop a beverage container holding a hot beverage and showing the outfitted beverage container in an angled position for outletting beverage from the primary beverage outlet, directional arrows depicting beverage movement according to the angled position, and a depiction of heat being transferred from the beverage as received in the beverage cooling channels.

The lid construction 11 may optionally or alternatively comprise a lid top 21 and a lid rim 23. The lid rim 23 is preferably parallel to a horizontal plane extending in first and second dimensions respectively as at 201 and 202 when attached to the beverage or liquid container 10 in a vertical orientation as generally depicted in FIGS. 5 and 7. Referencing FIGS. 5 and 7, line 102 there depicts a rim plane parallel to the horizontal. The interstitial beverage or liquid-cooling channel 4 preferably extends obliquely in a third dimension as at 203 at an angle 103 relative to the horizontal plane when attached to the beverage or liquid container 10 in the vertical orientation.

The lid top 21 is preferably also angled obliquely relative to the lid rim 23 (at a second oblique angle relative to the line or rim plane 102 opposite angle 103) such that a lid peak as at 210 is structurally situated anteriorly adjacent the primary beverage outlet 25 and a lower lid portion 211. The reader will thus note that the lid top 21 is preferably sloped downwardly away from anterior portions of the lid construction, while the liquid-cooling channel 4 is preferably sloped downwardly toward anterior portions of the lid construction.

The obliquely angled lid top of a first lid-insert combination may be oriented in opposed inferior adjacency to the downwardly extended portion of a second lid-insert combination thereby creating a lid stacking arrangement characterized by oppositely faced anterior portions of the lid-insert combinations in sequentially stacked lid-insert combinations, said stacking arrangement for reducing stacked height of lid-insert combinations as generally and comparatively depicted in FIGS. 11 and 12.

A select construction as selected from the group consisting of the lid construction 11 and the insert construction(s) 12, preferably comprises a resilient material construction. The resilient material construction, particularly at the wall portion 212, enables a resiliently compressed stacking arrangement as generally depicted in FIG. 12. The resiliently compressed stacking arrangement generally depicted in FIG. 12 forms a compressed stacked height of lid-insert combinations as at height 124. Compressed stacked height 124 is lesser than decompressed stacked height 125 otherwise generally depicted in FIG. 11.

A lid-insert combination packaging method, according to the present invention and believed supported by the foregoing specifications and drawings submitted in support thereof, minimizes packaging space and may preferably provide end-users with pre-relaxed lid-insert combinations. The packaging method according to the present invention may be said to preferably comprise the initial step of outfitting a series of lid constructions (e.g. lid constructions 11) with a series of insert constructions (e.g. insert constructions 12) or forming a series of insert-outfitted lid assemblies, each outfitted lid construction being configurable in a first radially-directed lid configuration (as at lid assemblies 50) or a second radially-directed lid configuration (as at lid assemblies 51) opposite the first radially-directed lid configuration.

In other words, the first radially-directed lid configuration is oriented such that the anterior aspects of the lid assemblies extend in a first radial direction as at arrow 126, and the second radially-directed lid configuration is oriented such that the anterior aspects of the lid assemblies extend in a second radial direction 127 opposite the first radial direction 126. The series of insert-outfitted lid assemblies are stacked in a relaxed stacked columnar formation, such that the first lid configuration is alternated with the second lid configuration. The relaxed stacked columnar formation may then be compressed into compressed stacked columnar formation as generally depicted in FIG. 12, and later decompressed from the compressed stacked columnar formation into a decompressed stacked columnar formation as is generally depicted in FIG. 11.

The compressed stacked columnar formation may be force-maintained via certain force maintenance means as may be exemplified by a certain wrapping or packaging, and the force-maintained compressed stacked columnar formation may then be shipped to an end user. Noting that the walls of the outfitted lid constructions may preferably comprise certain resilient materials, the method may comprise the optional steps of radially actuating (as at arrow 128) the resilient material constructions (e.g. of the walls 212) via underlying upper wall-engaging portions (e.g. peaks 210) of successive lid constructions during the compression step thereby creating a first space 130 between wall 22 and wall 212; and radially relaxing (as at arrow 129) the resilient material constructions (e.g. of the walls 212) during the decompression step thereby creating a second space 131 between wall 22 and wall 212, the second space 131 being greater than the first space 130 as comparatively depicted in FIGS. 11 and 11A versus FIGS. 12 and 12A.

Accordingly, although the invention has been described by reference to certain preferred embodiments and certain associated methodologies, it is not intended that the novel arrangement and methods be limited thereby, but that modifications thereof are intended to be included as falling within the broad scope and spirit of the foregoing disclosures and the appended drawings.

I claim:

1. A hot beverage container assembly for enabling a user to enhance heat transfer from a relatively hot assembly-contained beverage prior to consumption, the hot beverage container assembly comprising, in combination:
a beverage container and a lid construction, the lid construction comprising a lid rim, a primary beverage outlet, a downwardly extended primary dam structure, and at least one interstitial beverage-cooling channel, the lid construction being attachable to the beverage container for defining a lower beverage-containing compartment, the lid rim being parallel to a horizontal plane extending in first and second dimensions when attached to the beverage container in a vertical orientation, the primary dam structure being located in inferior adjacency to the primary beverage outlet for selectively transferring beverage intermediate the beverage-containing compartment and the at least one interstitial beverage-cooling channel, the at least one interstitial beverage-cooling channel being interstitially defined by at least a radially outward first wall and a radially inward second wall, the at least one interstitial beverage-cooling channel extending obliquely in a third dimension relative to the horizontal plane when attached to the beverage container in the vertical orientation, the radially inward second wall being non-uniformly spaced from the radially outward first wall, the obliquely angled at least one beverage-cooling channel and the non-uniformly spaced radially inward second wall and radially outward first wall together being cooperable for (a) creating a pressure differential within the at least one interstitial beverage-cooling channel as beverage travels toward the primary beverage outlet and (b) delaying beverage travel via the pressure differential within the at least one interstitial beverage-cooling channel, the at least one interstitial beverage-cooling channel thus for directing beverage from the beverage-containing compartment to the primary beverage outlet and transferring heat therefrom before said beverage exits the primary beverage outlet, the primary dam structure thereby providing a beverage-redirection mechanism for enabling the user to redirect beverage movement via the lid construction for delaying beverage delivery via the primary beverage outlet and transferring heat therefrom prior to beverage consumption.

2. The hot beverage container assembly of claim 1 wherein the downwardly extended primary dam structure extends inwardly and partially across a diameter of the lid construction in inferior adjacency to the primary beverage outlet.

3. The hot beverage container assembly of claim 1 wherein the lid construction defines a continuous, ring-shaped and peripheral interstitial beverage-receiving channel for simultaneously effecting radially inwardly and radially outwardly directed heat transfer from the hot beverage through the radially outward first wall and radially inward second wall of the lid construction, the radially inwardly and radially outwardly directed heat transfer effected by the continuous, ring-shaped and peripheral interstitial beverage-receiving channel for enhancing heat transfer from the hot beverage prior to exiting the primary beverage outlet.

4. The hot beverage container assembly of claim 3 wherein the radially outward first wall is substantially linear in vertical cross-section and the radially inward second wall is arcuate in vertical cross-section, the arcuate radially inward second wall for enhancing radially inwardly directed heat transfer characteristics of the hot beverage container assembly.

5. A lid construction for enabling a user to transfer heat from a relatively hot assembly-contained liquid, the lid construction comprising:
a lid rim, a primary liquid outlet, at least one interstitial liquid-cooling channel, and a primary dam structure, the lid rim being parallel to a horizontal plane extending in first and second dimensions when attached to a liquid container in a vertical orientation, the primary dam structure for selectively transferring liquid intermediate a liquid-containing compartment and the at least one interstitial liquid-cooling channel, the at least one interstitial liquid-cooling channel being interstitially defined by at least a radially outward first wall and a radially inward second wall, the at least one interstitial liquid-cooling channel extending obliquely in a third dimension at a first angle relative to the horizontal plane when attached to the liquid container in the vertical orientation, the radially inward second wall being non-uniformly spaced from the radially outward first wall, the obliquely angled at least one liquid-cooling channel and the non-uniformly spaced first and second walls together being cooperable for (a) creating a pressure differential within the at least one interstitial liquid-cooling channel as liquid travels toward the primary liquid outlet and (b) delaying liquid travel via the pressure differential within the at least one interstitial liquid-cooling channel, the at least one interstitial liquid-cooling channel thus for directing liquid therethrough and receiving heat therefrom before said liquid exits the primary liquid outlet, the primary dam structure thus providing a liquid-redirection mechanism for delaying liquid delivery via the primary liquid outlet and transferring heat therefrom.

6. The lid construction of claim 5 wherein the primary dam structure extends downwardly and peripherally inwardly partially across a diameter of the lid construction in inferior adjacency to the primary beverage outlet.

7. The lid construction of claim 5 wherein the radially inward second wall, being non-uniformly spaced from the radially outward first wall, defines a central zone of maximum spacing underlying the primary liquid outlet, laterally offset minimum spacing zones laterally adjacent the central zone of maximum spacing, laterally offset moderate spacing zones laterally adjacent the laterally offset minimum spacing zones, and a zone of uniform spacing interconnecting the laterally offset moderate spacing zones.

8. The lid construction of claim 5 wherein the at least one interstitial liquid-cooling channel provides a continuous, ring-shaped liquid-receiving channel for peripherally channeling channel-received liquid for simultaneously effecting radially inwardly and radially outwardly directed heat transfer from said channel-received liquid through the radially outward first wall and the radially inward second wall.

9. The container lid construction of claim 8 wherein the radially outward second wall is substantially linear in vertical cross-section and the radially inner second wall is arcuate in vertical cross-section, the arcuate radially inward second wall for enhancing heat transfer characteristics of the lid construction.

10. The lid construction of claim 6 comprising a lid top, the lid top extending obliquely in the third dimension at a second angle relative to the horizontal plane, the second angle being oppositely angled relative to the first angle.

11. The lid construction of claim 10 wherein the obliquely angled lid top and the obliquely angled at least one interstitial liquid-cooling channel are obliquely angled in opposite directions relative to the lid rim, the lid top being sloped downwardly away from anterior portions of the lid construction, the at least one liquid-cooling channel being sloped downwardly toward anterior portions of the lid construction.

12. A lid construction for enabling a user to transfer heat from a relatively hot assembly-contained liquid, the lid construction comprising:

a lid rim, a primary liquid outlet, an interstitial liquid-cooling channel, and a primary dam structure, the lid rim being parallel to a horizontal plane extending in first and second dimensions when attached to a liquid container in a vertical orientation, the primary dam structure for selectively transferring liquid intermediate a liquid-containing compartment and the interstitial liquid-cooling channel, the interstitial liquid-cooling channel (a) being interstitially defined by at least a first material structure and a second material structure and (b) extending obliquely in a third dimension at a first angle relative to the horizontal plane when attached to the liquid container in the vertical orientation, the second material structure being non-uniformly spaced from the first material structure, the obliquely angled and non-uniform spacing of the first and second material structures of the interstitial liquid-cooling channel being cooperable for delaying liquid travel within the interstitial liquid-cooling channel, the interstitial liquid-cooling channel for directing liquid therethrough and receiving heat therefrom before channel-directed liquid exits the primary liquid outlet, the primary dam structure and the interstitial liquid-cooling channel thus providing a liquid-redirection mechanism for delaying liquid delivery via the primary liquid outlet and transferring heat therefrom.

13. The lid construction of claim 12 wherein the primary dam structure extends downwardly and peripherally inwardly partially across a diameter of the lid construction in inferior adjacency to the primary beverage outlet.

14. The lid construction of claim 12 wherein the interstitial liquid-cooling channel enables simultaneous directed heat transfer in opposite directions from the channel-directed liquid via the first and second material structures.

15. The lid construction of claim 12 wherein the first material structure is substantially linear in vertical cross-section and the second material structure is arcuate in vertical cross-section.

16. The lid construction of claim 12 comprising a lid top, the lid top extending obliquely in the third dimension at a second angle relative to the horizontal plane, the second angle being oppositely angled relative to the first angle.

17. The lid construction of claim 16 wherein the obliquely angled lid top and the obliquely angled interstitial liquid-cooling channel are obliquely angled in opposite directions relative to the lid rim, the lid top being sloped downwardly away from anterior portions of the lid construction, the at least one liquid-cooling channel being sloped downwardly toward anterior portions of the lid construction.

* * * * *